(12) United States Patent
Hemkumar et al.

(10) Patent No.: US 12,169,720 B2
(45) Date of Patent: *Dec. 17, 2024

(54) SYSTEM WITH DYNAMICALLY SELECTABLE FIRMWARE IMAGE SEQUENCING FOR PRODUCTION TEST, DEBUG, PROTOTYPING

(71) Applicant: Cirrus Logic International Semiconductor Ltd., Edinburgh (GB)

(72) Inventors: Nariankadu D. Hemkumar, Austin, TX (US); Christopher Jackson, Austin, TX (US); Younes Djadi, Austin, TX (US); Nathan Daniel Pozniak Buchanan, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/957,708

(22) Filed: Sep. 30, 2022

(65) Prior Publication Data

US 2023/0080059 A1 Mar. 16, 2023

Related U.S. Application Data

(63) Continuation-in-part of application No. 17/472,196, filed on Sep. 10, 2021, now Pat. No. 11,899,567.

(51) Int. Cl.
*G06F 9/4401* (2018.01)
*G06F 8/65* (2018.01)
*G06F 9/38* (2018.01)

(52) U.S. Cl.
CPC ............. *G06F 9/4401* (2013.01); *G06F 8/65* (2013.01); *G06F 9/3802* (2013.01)

(58) Field of Classification Search
CPC ......... G06F 9/4401; G06F 8/65; G06F 9/3802
See application file for complete search history.

(56) References Cited

U.S. PATENT DOCUMENTS

| 7,535,249 | B1 | 5/2009 | Knapp |
| 2002/0078336 | A1 | 6/2002 | Singh et al. |
| 2004/0049669 | A1* | 3/2004 | Schelling ............ G06F 9/44547 713/2 |
| 2007/0214349 | A1 | 9/2007 | Gu et al. |

(Continued)

*Primary Examiner* — Wei Y Zhen
*Assistant Examiner* — Brahim Bourzik
(74) *Attorney, Agent, or Firm* — E. Alan Davis; Huffman Law Group, PC

(57) ABSTRACT

A system has a memory programmed with multiple firmware images each having an associated distinct entry point, a processor, a writable hardware register, and a controller external to the processor that, prior to each reset of a sequence of resets of the processor, reads the entry point of a firmware image from the hardware register and causes the processor to begin fetching instructions at the entry point read from the hardware register. The firmware images include boot, mission mode, and at least one other firmware image. The memory may be writeable with a modifiable version of a post-production mission mode, debug, prototype, or patched ROM firmware image. A second controller writes a second entry point to the hardware register prior to an initial reset such that the external controller reads the second entry point and causes fetching instructions at the second entry point rather than the initial entry point.

24 Claims, 11 Drawing Sheets

(56) References Cited

U.S. PATENT DOCUMENTS

| | | |
|---|---|---|
| 2011/0083042 A1 | 4/2011 | Chang et al. |
| 2011/0099423 A1* | 4/2011 | Chen .................... G06F 9/4401 714/25 |
| 2013/0111457 A1 | 5/2013 | Culter |
| 2014/0122847 A1 | 5/2014 | Henry et al. |
| 2014/0325197 A1* | 10/2014 | Lewis .................. G06F 9/4418 713/2 |
| 2018/0329835 A1 | 11/2018 | van Riel et al. |
| 2020/0201638 A1 | 6/2020 | Gerzon et al. |
| 2021/0240646 A1* | 8/2021 | Robertson ............ G06F 9/4406 |

\* cited by examiner

*FIG. 9*

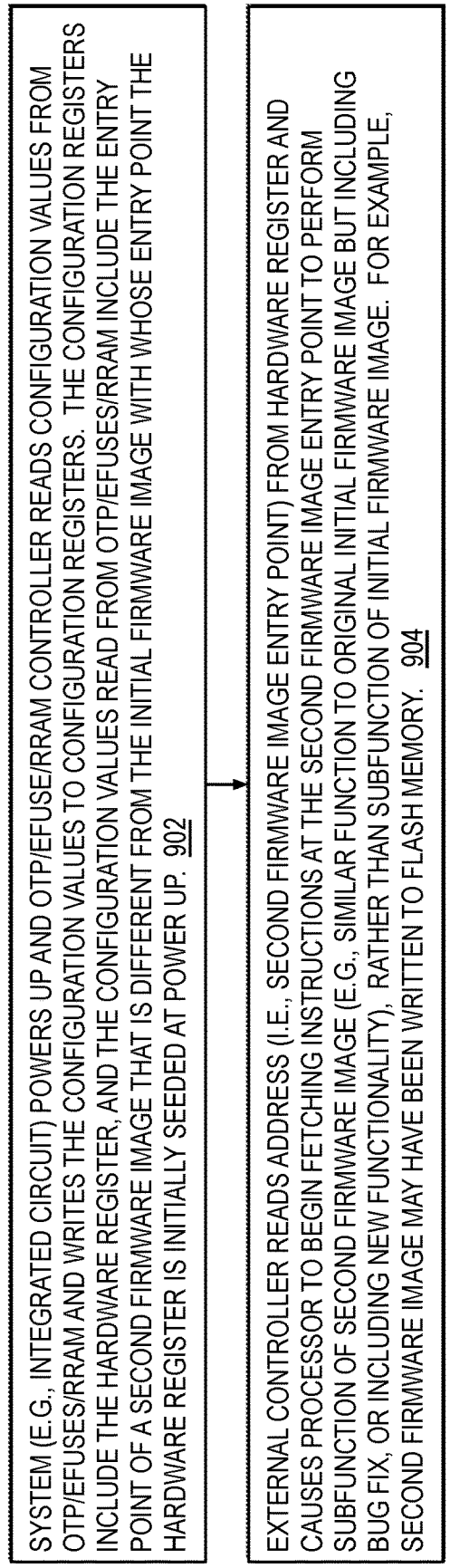

SYSTEM (E.G., INTEGRATED CIRCUIT) POWERS UP AND OTP/EFUSE/RRAM CONTROLLER READS CONFIGURATION VALUES FROM OTP/EFUSES/RRAM AND WRITES THE CONFIGURATION VALUES TO CONFIGURATION REGISTERS. THE CONFIGURATION REGISTERS INCLUDE THE HARDWARE REGISTER, AND THE CONFIGURATION VALUES READ FROM OTP/EFUSES/RRAM INCLUDE THE ENTRY POINT OF A SECOND FIRMWARE IMAGE THAT IS DIFFERENT FROM THE INITIAL FIRMWARE IMAGE WITH WHOSE ENTRY POINT THE HARDWARE REGISTER IS INITIALLY SEEDED AT POWER UP. 902

EXTERNAL CONTROLLER READS ADDRESS (I.E., SECOND FIRMWARE IMAGE ENTRY POINT) FROM HARDWARE REGISTER AND CAUSES PROCESSOR TO BEGIN FETCHING INSTRUCTIONS AT THE SECOND FIRMWARE IMAGE ENTRY POINT TO PERFORM SUBFUNCTION OF SECOND FIRMWARE IMAGE (E.G., SIMILAR FUNCTION TO ORIGINAL INITIAL FIRMWARE IMAGE BUT INCLUDING BUG FIX, OR INCLUDING NEW FUNCTIONALITY), RATHER THAN SUBFUNCTION OF INITIAL FIRMWARE IMAGE. FOR EXAMPLE, SECOND FIRMWARE IMAGE MAY HAVE BEEN WRITTEN TO FLASH MEMORY. 904

SYSTEM WITH DYNAMICALLY SELECTABLE FIRMWARE IMAGE SEQUENCING FOR PRODUCTION TEST, DEBUG, PROTOTYPING

CROSS REFERENCE TO RELATED APPLICATION(S)

This application is a continuation-in-part of U.S. Non-Provisional application Ser. No. 17/472,196, filed Sep. 10, 2021, entitled SYSTEM WITH HARDWARE REGISTER AND CONTROLLER EXTERNAL TO PROCESSOR THAT FACILITATES TRANSITIONS BETWEEN FIRMWARE IMAGES USING HARDWARE REGISTER WRITTEN WITH FIRMWARE IMAGE ENTRY POINTS, which is hereby incorporated by reference in its entirety.

This application is related to U.S. Non-Provisional application, Ser. No. 17/957,614, filed concurrently herewith, and which is hereby incorporated by reference in its entirety.

BACKGROUND

The time and expense required to develop and test software is often significant. This situation may be particularly true in the case of software that provides low-level control for the hardware of a device, such as components of a smartphone, tablet, notebook, portable audio device, automobile, and so forth. This type of software is referred to by various names such as embedded software or firmware, among others. It may be particularly important to thoroughly test firmware and verify that it meets design requirements for various reasons. For example, the firmware may provide a mission-critical function. For another example, it may be more difficult to update the firmware to fix bugs than other software, such as application software or the operating system of a personal computer. This difficulty may be particularly true if the firmware is stored in a read-only memory (ROM) which may require physically replacing the ROM on the device.

For these reasons, firmware that has been thoroughly tested may be of great value and the ability to reuse it may enhance the value significantly. At the same time, it may often be necessary to add new features or functionality to the firmware of a device. However, introducing the new features, via new source code, may require the full testing of the new firmware—not only of the new functionality but also re-testing to verify that the earlier functionality was not broken by the introduction of the new functionality. This scenario may introduce significant additional test time and expense. Systems and methods are needed to preserve the prior investment in development and testing of the earlier firmware functionality to reduce firmware test time.

SUMMARY

In one embodiment, the present disclosure provides a system comprising a memory programmed with multiple firmware images. Each firmware image of the multiple firmware images has an associated entry point that is distinct from the entry point of the other firmware images. The system further comprises a processor that fetches instructions of the multiple firmware images from the memory and executes the fetched instructions, a hardware register writable with an address, and a controller that is external to the processor. The external controller is configured to, prior to each reset of a sequence of resets of the processor, read the entry point of one of the firmware images from the hardware register and cause the processor to begin fetching instructions at the entry point read from the hardware register. The multiple firmware images comprise a boot firmware image, a mission mode firmware image, and at least one other firmware image.

In another embodiment, the present disclosure provides a system comprising at least one non-volatile memory programmed with multiple firmware images. Each firmware image of the multiple firmware images has an associated entry point that is distinct from the entry point of the other firmware images. The system further comprises a processor that fetches instructions of the multiple firmware images from the non-volatile memory and executes the fetched instructions and a hardware register writable with an address. The hardware register is initially seeded with an address that is the entry point of an initial firmware image among the multiple firmware images. The system further comprises a first controller that is external to the processor. The external controller is configured to, prior to each reset of a sequence of resets of the processor, read the entry point of one of the firmware images from the hardware register and cause the processor to begin fetching instructions at the entry point read from the hardware register. The system further comprises a second controller configured to write a second entry point of a second firmware image among the multiple firmware images to the hardware register prior to an initial reset of the sequence of resets of the processor such that the first external controller reads the second entry point from the hardware register and causes the processor to begin fetching instructions at the second entry point read from the hardware register rather than the entry point of the initial firmware image.

In yet another embodiment, the present disclosure provides a method for use in a system comprising a memory programmed with multiple firmware images. Each firmware image of the multiple firmware images has an associated entry point that is distinct from the entry point of the other firmware images. The system further comprises a processor that fetches instructions of the multiple firmware images from the memory and executes the fetched instructions, a hardware register writable with an address, and a controller that is external to the processor. The method includes, prior to each reset of a sequence of resets of the processor: reading, by the external controller, the entry point of one of the firmware images from the hardware register, and causing, by the external controller, the processor to begin fetching instructions at the entry point read from the hardware register. The multiple firmware images comprise a boot firmware image, a mission mode firmware image, and at least one other firmware image.

In yet another embodiment, the present disclosure provides a method for use in a system comprising at least one non-volatile memory programmed with multiple firmware images. Each firmware image of the multiple firmware images has an associated entry point that is distinct from the entry point of the other firmware images. The system further comprises a processor that fetches instructions of the multiple firmware images from the non-volatile memory and executes the fetched instructions and a hardware register writable with an address. The hardware register is initially seeded with an address that is the entry point of an initial firmware image among the multiple firmware images. The system further comprises a first controller that is external to the processor and a second controller. The method comprises, prior to each reset of a sequence of resets of the processor: reading, by the external controller, the entry point of one of the firmware images from the hardware register, and causing, by the external controller, the processor to begin fetching instructions at the entry point read from the hardware register. The method further comprises writing, by the second controller, a second entry point of a second firmware image among the multiple firmware images to the hardware register prior to an initial reset of the sequence of resets of the processor such that the first external controller reads the second entry point from the hardware register and causes the processor to begin fetching instructions at the second entry point read from the hardware register rather than the entry point of the initial firmware image.

BRIEF DESCRIPTION OF THE DRAWINGS

FIG. 9 is an example flowchart illustrating operation of a processor of a system of FIG. 6 to boot from an initial firmware image different from the firmware image whose entry point is initially seeded in the corresponding hardware register at power up of the system in accordance with embodiments of the present disclosure.

DETAILED DESCRIPTION

Figure 1:
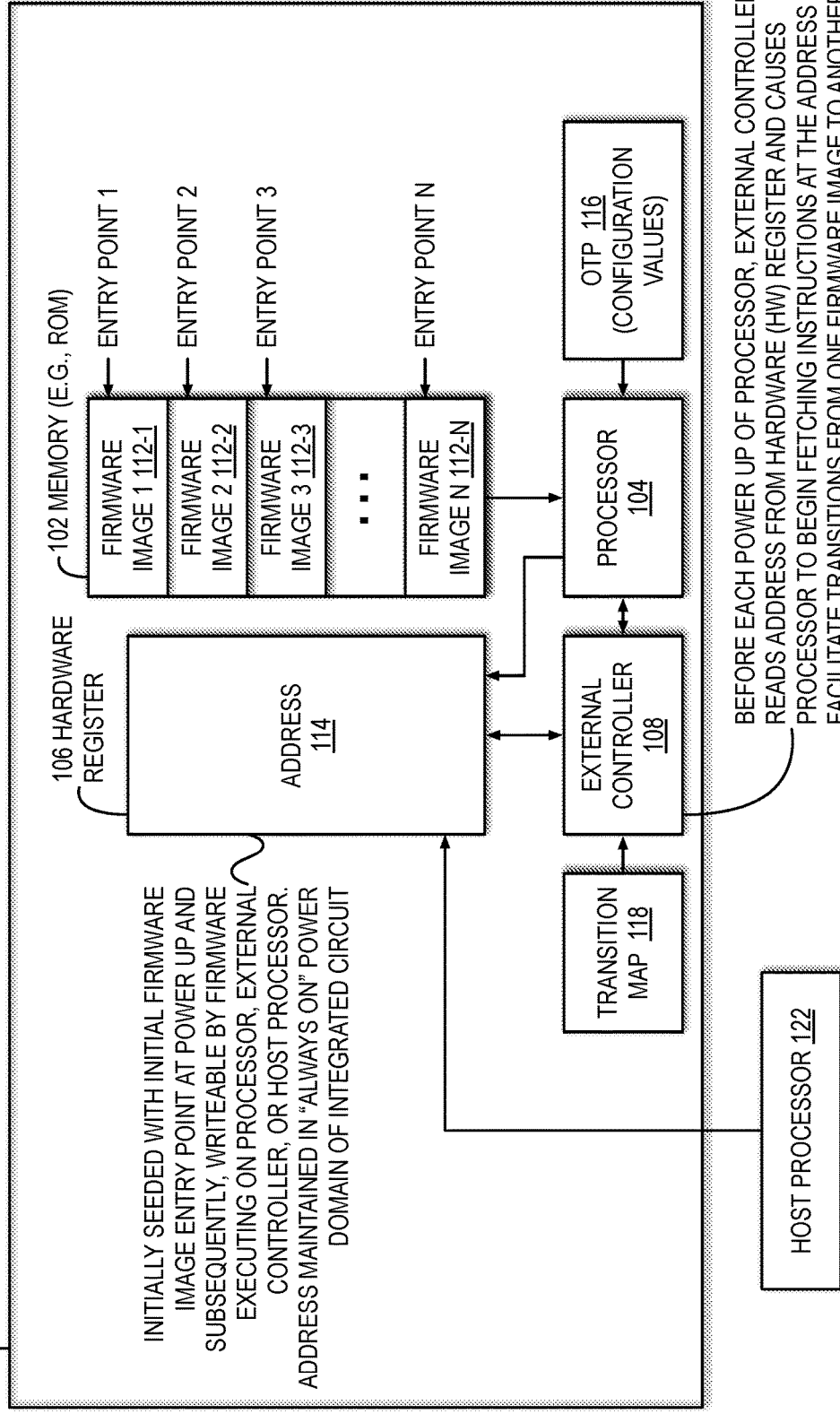
FIG. 1 is an example apparatus in accordance with embodiments of the present disclosure.

FIG. 1 is an example apparatus 100 in accordance with embodiments of the present disclosure. The apparatus 100 includes a system 101 and a host processor 122. The apparatus 100 may be any electronic apparatus such as, for example, a smartphone, portable audio device, camera, portable computing device such as a tablet or notebook or laptop, or self-driving vehicle component. The host processor 122 that communicates with and directs operation of the system 101. For example, the host processor 122 may be the main processor that executes the operating system of a smartphone, portable audio device, camera, portable computing device such as a tablet or notebook or laptop, or self-driving vehicle component.

The system 101 comprises a memory 102, a processor 104 that fetches instructions from the memory 102 and executes them, a hardware register 106 that holds an address 114, and a controller 108 that is external to the processor 104. Preferably, the external controller 108 holds the processor 104 in reset until the external controller 108 has read the address 114 from the hardware register 106 and provided it to the processor 104. The external controller 108 then releases the processor 104 from reset so that the processor 104 begins to fetch instructions from the memory 102 at the address 114 provided to the processor 104 by the external controller 108. The hardware register 106 may also be referred to as a boot-vector register. The hardware register 106 may be a flip-flop, random access memory (RAM) location, or other analogous circuit configured to retain its state when the system 101 is transitioned to a low-power inactive state of the system 101 (also referred to as a standby state, or dormant state) as described below.

The system 101 may be an integrated circuit. In one embodiment, the integrated circuit includes an "always on" power domain that keeps limited elements of the integrated circuit powered—such as the hardware register 106 to retain the current value of the address 114—even when other elements of the integrated circuit are powered down during a lower power inactive state of the system 101 to reduce power consumed by the integrated circuit. The system 101 may control one or more subsystems or sub-devices of the apparatus 100, such as a camera, haptic elements, audio transducers, video displays, and so forth.

The memory 102 may be a read-only memory (ROM), flash memory or other type of memory capable of storing program instructions fetchable and executable by the processor 104. The memory 102 is non-volatile, i.e., it retains its contents when powered off. In embodiments in which the memory 102 is read-only, a writable memory (e.g., RAM, not shown) may also be connected to the processor 104 to facilitate the reading and writing of data such as program variables and other data.

The memory 102 is programmed with multiple firmware images 112. In the embodiment of FIG. 1, N firmware images 112 are shown, denoted as firmware image 1 112-1, firmware image 2 112-2, firmware image 3 112-3, and firmware image N 112-N, and each of the firmware images 112 has an associated entry point, respectively denoted entry point 1, entry point 2, entry point 3, and entry point N. As shown in the embodiment of FIG. 1, the memory 102 is effectively partitioned such that the firmware images 112 reside completely within distinct respective address ranges within the memory 102. Each firmware image 112 programmed into the memory 102 is a self-contained executable image residing within its partition, i.e., within its distinct address range. Each partition of the memory 102 may be programmed from a file that is in an executable file format, e.g., an Executable and Link Format (ELF) or binary (bin) format, that includes the bytes of the associated firmware image 112. Embodiments of the process for generation of the firmware images 112 are described below, e.g., with respect to FIG. 5.

The entry point of each firmware image 112 is distinct from the entry point of the other firmware images 112. The entry point of a firmware image 112 is the address of the location in the memory 102 of the first instruction that, according to the design of the firmware image 112, the processor 104 is to fetch and execute. The processor 104 executes the firmware images 112 so that the system 101 may perform various subfunctions—such as system initialization processing, camera control processing, haptic processing, audio processing, video processing—to control the subsystems or sub-devices of the apparatus 100 to achieve the overall functionality of the system 101. That is, although each firmware image 112 is a self-contained executable image, the firmware images 112 individually do not provide the full system 101 functionally but instead each only provides a subfunction; whereas, in combination via transitions from the initial firmware image 112 to other firmware images 112 (and, in some embodiments, back to the initial firmware image 112) facilitated by the hardware register 106 and external controller 108, the full system 101 functionally is achieved.

The processor 104 may write the hardware register 106 with the address 114. That is, the processor 104 may execute instructions of the firmware images 112 that instruct the processor 104 to write the address 114 to the hardware register 106. The external controller 108 may also write the hardware register 106 with the address 114, e.g., with values read from a transition map, as described in more detail below. The host processor 122 may also write the hardware register 106 with the address 114, e.g., prior to the host processor 122 causing the system 101 to be reset or transition from a low-power inactive state to an active state. The "always on" power domain of the system 101 may also keep powered the logic needed for the host processor 122 and/or external controller 108 to write the hardware register 106 and for the external controller 108 to read a transition map 118, described in more detail below. Through a sequence of writes of different addresses 114 to the hardware register 106—namely different entry points of the firmware images 112—followed by resets of the processor 104, different transitions between different firmware images 112 are accomplished. Advantageously, different system 101 functionalities may be achieved via different sequences, or combinations, of writes of different addresses 114 (i.e., different entry points of the firmware images 112) to the hardware register 106 by the processor 104, external controller 108, and/or processor 104, as described in more detail below.

When the system 101 is initially powered on, e.g., when the apparatus 100 is powered on or the host processor 122 causes the system 101 to receive power, the hardware register 106 is initially seeded with an address 114 that is the entry point of an initial one of the firmware images 112, i.e., the firmware image 112 to be executed when the processor 104 comes out of its initial reset. The initial firmware image may be located at an arbitrary location within the memory. That is, the address 114 with which the hardware register 106 is initially seeded, i.e., the entry point of the initial firmware image 112, may be selected to be the address of any location within the memory 102 that contains the valid instruction to be fetched and executed by the processor 104 when it comes out of its initial reset. In one embodiment, a boot vector table is located at the first/lowest address in the initial firmware image 112, and the initially seeded address 114 of the hardware register 106 is a location within the address range of the initial firmware image 112 other than the boot vector table location, and the memory 102 is programmed at the initially seeded address 114 with a branch instruction that branches to the first entry in the boot vector table. The memory 102 may be programmed similarly for other firmware images 112.

The firmware images 112 may be programmed to instruct the external controller 108 to place the system 101 in a low-power inactive state. The host processor 122 may also place the system 101 in a low-power inactive state. As described above, the system 101 is subsequently transitioned from the low-power inactive state to the active state, and the external controller 108 reads the address 114 from the hardware register 106—which remains powered by the "always on" power domain of the system 101 during the low-power inactive state to retain the address 114—and causes the processor 104 to come out of reset and begin fetching instructions at the address 114 read from the hardware register 106. Thus, at least a portion of the system 101 remains powered on from the initial reset of the processor 104 throughout the various firmware image 112 transitions to accomplish the overall system 101 functionality achieved by the combination of firmware image 112 subfunctions. When the processor 104 is executing a firmware image 112, the system 101 may be referred to as being in a functional state. When the system 101 is in a low-power inactive state—e.g., the processor 104 is powered off and not executing instructions—the system 101 may be referred to as being in a dormant state. In this manner, the system 101 may transition from the initial functional state (i.e., execution of the initial firmware image 112) to a second functional state (i.e., execution of a second firmware image 112) and possibly to a third functional state and so forth, preferably through dormant state transitions, advantageously without power cycling the entire system 101, to achieve the full system 101 functionality that is not provided individually by any one of the subfunctions of the firmware images 112 alone, i.e., not provided individually by any one of the functional states alone.

The system 101 may also include a one-time programmable memory (OTP) 116 readable by the processor 104. The OTP 116 may hold configuration values that the processor 104 reads, e.g., during execution of the initial firmware image 112, and uses to configure the system 101. For example, the configuration values may include firmware patches and trim values that are applied to various components, e.g., to calibrate resistor/capacitor values that need to match precisely. The system 101 may also include the transition map 118. In one embodiment, the transition map 118 is stored in the memory 102 or in the OTP 116 or in another memory readable by the external controller 108. The transition map 118 specifies an ordered sequence of entry points associated with two or more of the firmware images 112 that the external controller 108 may read and then write to the hardware register 106 to facilitate transitions between the firmware images 112, as described in more detail below.

Embodiments are contemplated in which the system 101 includes multiple processors 104, each having a respective hardware register 106, and upon power up of each of the processors 104, the external controller 108 reads the hardware registers 106 and causes the processors 104 to begin fetching instructions at the respective addresses 114 read from the respective hardware registers 106.

Figure 2:
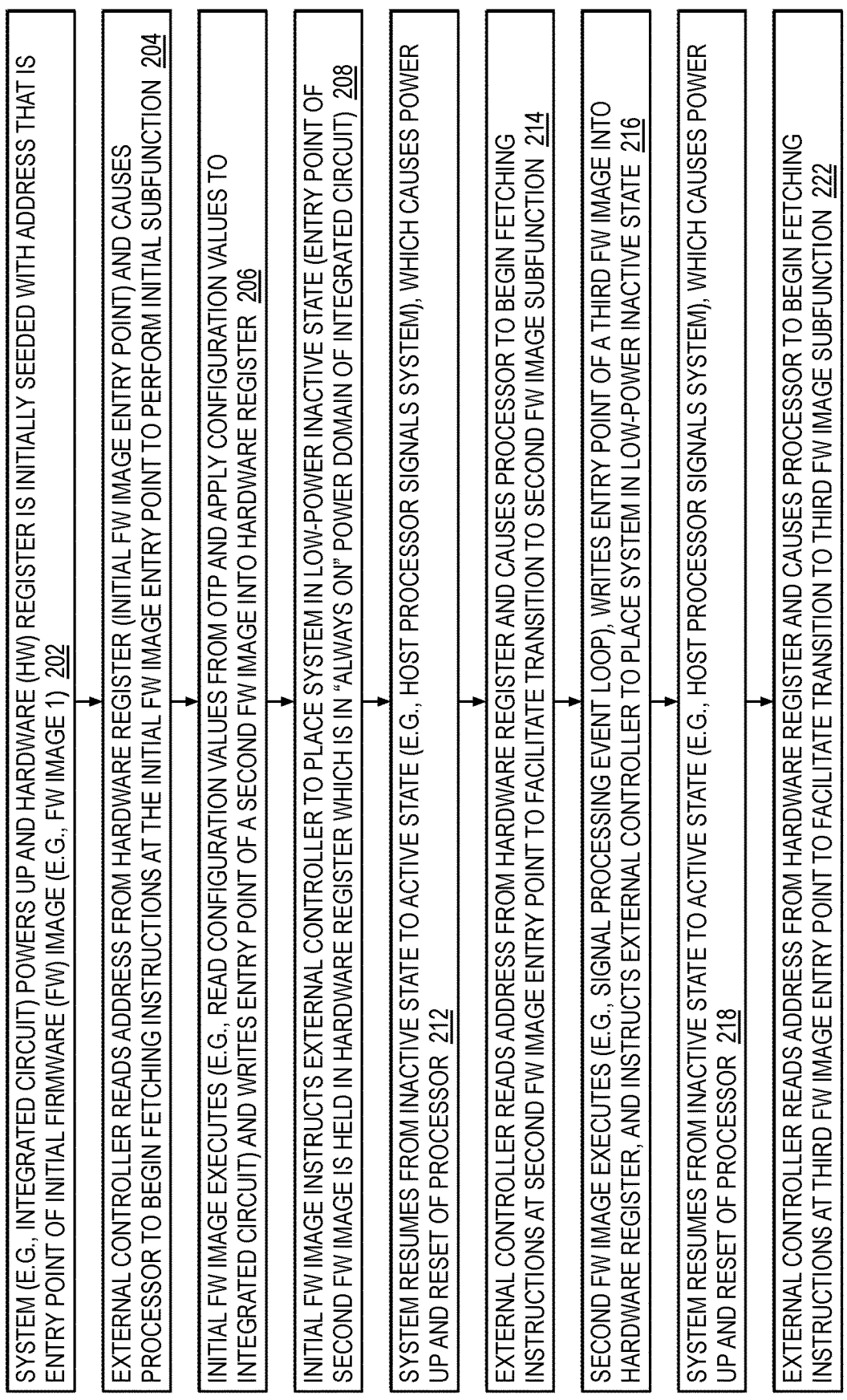
FIG. 2 is an example flowchart illustrating operation of the apparatus of FIG. 1 in accordance with embodiments of the present disclosure.

FIG. 2 is an example flowchart illustrating operation of the apparatus 100 of FIG. 1 in accordance with embodiments of the present disclosure. Operation begins at block 202.

At block 202, the system 101 goes from a fully unpowered state to a powered-up state, e.g., at power up of the apparatus 100. Additionally, once the system 101 is in a powered-up state, the host processor 122 may issue a reset to the system 101 which resets the entire integrated circuit 101, including the "always on" power domain. In response to being powered up or reset, the hardware register 106 is initially seeded with an address 114 that is the entry point of the initial firmware image 112, i.e., one of the firmware images 112 stored in the memory 102. Operation proceeds to block 204.

At block 204, the external controller 108 reads the address 114 from the hardware register 106, which is the initial firmware image 112 entry point, and causes the processor 104 to begin fetching instructions at the initial firmware image 112 entry point. As described above, the external controller 108 may hold the processor 104 in reset, write the address 114 read from the hardware register 106 to the processor 104 (e.g., a register of the processor 104), and then release the processor 104 from reset. The processor 104 is configured to, when released from reset, read the address written by the external controller 108 and fetch its first instruction from the address. Operation proceeds to block 206.

At block 206, the initial firmware image 112 executes to perform an initial subfunction, i.e., the subfunction of the initial firmware image 112. In one embodiment, a portion of the subfunction of the initial firmware image 112 is to read the configuration values from the OTP 116 and configure the system 101 with them. Subsequently, the initial firmware image 112 writes the hardware register 106 with the entry point of a second firmware image 112, e.g., firmware image N 112-N. Operation proceeds to block 208.

At block 208, the initial firmware image 112 instructs the external controller 108 to place the system 101 into a low-power inactive state. As described above, even during the low-power inactive state, the address 114 most recently written into the hardware register 106 is maintained because the hardware register 106 (and any other needed logic) is kept powered by the "always on" power domain of the integrated circuit 101. Operation proceeds to block 212.

At block 212, the system 101 resumes from the low-power inactive state to the active state (i.e., the system 101 is fully powered), which causes the processor 104 to be powered up and held in reset by the external controller 108. In one embodiment, the system 101 may resume to the active state in response to a signal from the host processor 122. Operation proceeds to block 214.

At block 214, the external controller 108 reads the address 114 from the hardware register 106 and causes the processor 104 to begin fetching instructions at the address 114, which is the entry point of the second firmware image 112 that was written by the initial firmware image 112 at block 206. Operation proceeds to block 216.

At block 216, the second firmware image 112 executes to perform a second subfunction, i.e., the subfunction of the second firmware image 112. In one embodiment, a portion of the subfunction of the second firmware image 112 is to perform a signal processing event loop for camera control processing, an example of which is described in U.S. patent application Ser. No. 17/320,528 filed May 14, 2021, which is hereby incorporated by reference in its entirety for all purposes. Subsequently, the second firmware image 112 writes the hardware register 106 with the entry point of a third firmware image 112, e.g., firmware image 3 112-3. The second firmware image 112 then instructs the external controller 108 to place the system 101 into a low-power inactive state, or alternatively the host processor 122 causes the system 101 to enter the low-power inactive state. Operation proceeds to block 218.

At block 218, the system 101 resumes from the low-power inactive state to the active state, which causes the processor 104 to be powered up and held in reset by the external controller 108. Operation proceeds to block 222.

At block 222, the external controller 108 reads the address 114 from the hardware register 106 and causes the processor 104 to begin fetching instructions at the address 114, which is the entry point of the third firmware image 112 that was written by the second firmware image 112 at block 216. Other transitions similar to those performed above from the initial firmware image 112 to the second firmware image 112 and from the second firmware image 112 to the third firmware image 112 may also be performed in order to execute the desired combination of subfunctions to achieve the desired functionality of the system 101.

Advantageously, because each transition to a firmware image 112 enjoys the benefit of executing on a fresh state of the processor 104 because the firmware image 112 is executed after a reset of the processor 104, the functionality of the firmware image 112 is not affected by the state in which any previous execution of a firmware image 112 may have left the processor 104. For example, artifacts in memory or the internal state of the processor 104 that may have been left by the previous firmware image 112 are cleared by the reset of the processor 104 during the transition to the new firmware image 112 such that the new firmware image 112 executes from a clean state. This clearing and reset may facilitate a savings in development and/or testing cost associated with a new revision of the memory 102. Furthermore, the split, or partitioned, nature of the firmware images 112 and the multi-state transitions (also referred to as multi-stage boot process) may have the advantage of facilitating parallel development and testing of the different firmware images 112, as described in more detail below, particularly with respect to FIG. 5.

Figure 3:
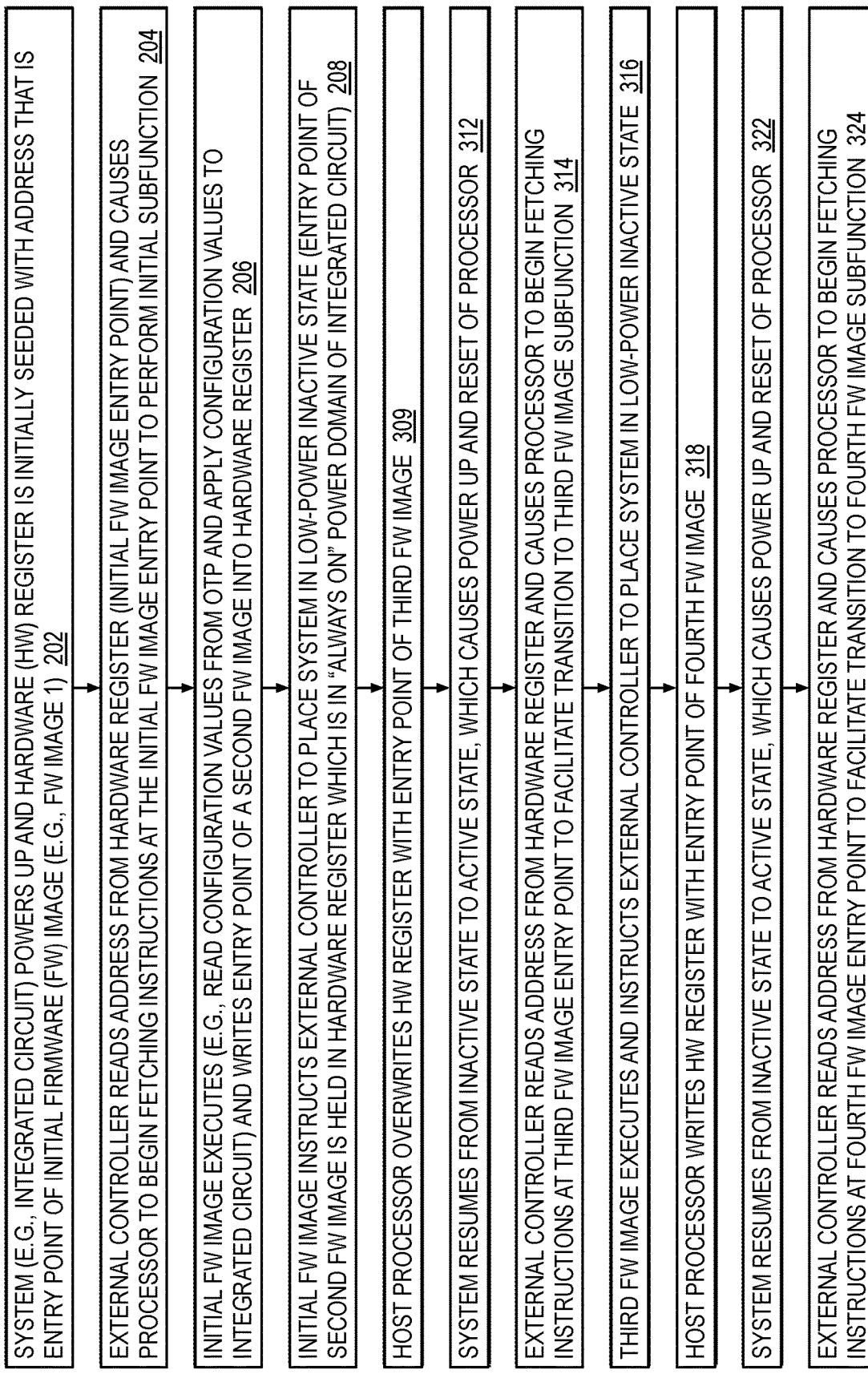
FIG. 3 is an example flowchart illustrating operation of the apparatus of FIG. 1 in accordance with embodiments of the present disclosure.

FIG. 3 is an example flowchart illustrating operation of the apparatus 100 of FIG. 1 in accordance with embodiments of the present disclosure. Operation begins at block 202 and proceeds through block 208 as described above with respect to FIG. 2. Advantageously, the subfunction of the initial firmware image 112 may be tested and then reused through transitions to different firmware images 112, i.e., according to the multi-boot process described herein, which may reduce testing time and expense. Operation proceeds from block 208 to block 309.

At block 309, the host processor 122 overwrites the hardware register 106 with the entry point of a third firmware image 112, e.g., firmware image 4 112-4. Operation proceeds to block 312.

At block 312, the system 101 resumes from the low-power inactive state to the active state, which causes the processor 104 to be powered up and held in reset by the external controller 108. Operation proceeds to block 314.

At block 314, the external controller 108 reads the address 114 from the hardware register 106 and causes the processor 104 to begin fetching instructions at the address 114, which is the entry point of the third firmware image 112 that was written by the host processor 122 at block 309. Operation proceeds to block 316.

At block 316, the third firmware image 112 executes to perform a third subfunction, i.e., the subfunction of the third firmware image 112. Subsequently, the third firmware image 112 instructs the external controller 108 to place the system 101 into a low-power inactive state, or alternatively the host processor 122 causes the system 101 to enter the low-power inactive state. In one embodiment, the third firmware image 112 writes the hardware register 106 with a firmware image 112 entry point prior to instructing the external controller 108 to place the system 101 into a low-power inactive state. Operation proceeds to block 318.

At block 318, the host processor 122 overwrites the hardware register 106 with the entry point of a fourth firmware image 112, e.g., firmware image 5 112-5. Operation proceeds to block 322.

At block 322, the system 101 resumes from the low-power inactive state to the active state, which causes the processor 104 to be powered up and held in reset by the external controller 108. Operation proceeds to block 324.

At block 324, the external controller 108 reads the address 114 from the hardware register 106 and causes the processor 104 to begin fetching instructions at the address 114, which is the entry point of the fourth firmware image 112 that was written by the host processor 122 at block 318. Other transitions similar to those performed above from the initial firmware image 112 to the third firmware image 112 and from the third firmware image 112 to the fourth firmware image 112 may also be performed in order to execute each of the desired subfunctions to achieve the full functionality of the system 101. Additionally, transitions achieved by one or more writes of the hardware register 106 by the host processor 122 may be combined with transitions achieved by one or more writes of the hardware register 106 by the processor 104 while executing a previously executing firmware image 112, as described with respect to FIG. 2.

Figure 4:
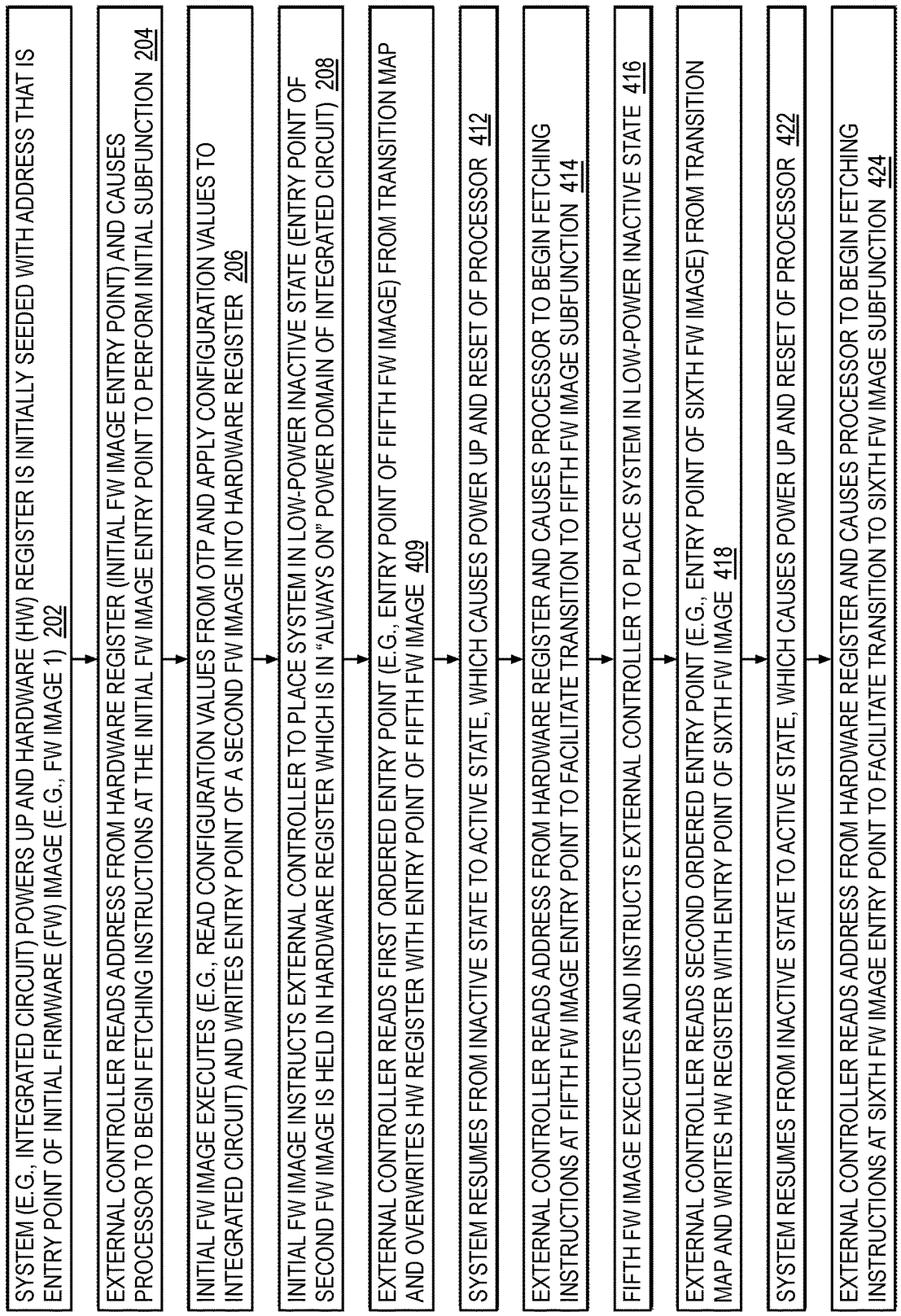
FIG. 4 is an example flowchart illustrating operation of the apparatus of FIG. 1 in accordance with embodiments of the present disclosure.

FIG. 4 is an example flowchart illustrating operation of the apparatus 100 of FIG. 1 in accordance with embodiments of the present disclosure. Operation begins at block 202 and proceeds through block 208 as described above with respect to FIG. 2. Operation proceeds from block 208 to block 409. In the example, the transition map 118 has been programmed (e.g., in the OTP 116) such that the first entry in its ordered sequence of entry points is the entry point of a fifth firmware image 112, e.g., firmware image 6 112-6, and the second entry in its ordered sequence of entry points is the entry point of a sixth firmware image 112, e.g., firmware image 2 112-2.

At block 409, the external controller 108 reads a first entry point in an ordered sequence of entry points from the transition map 118 of FIG. 1 and overwrites the hardware register 106 with the entry point of a fifth firmware image 112, e.g., firmware image 6 112-6. Operation proceeds to block 412.

At block 412, the system 101 resumes from the low-power inactive state to the active state, which causes the processor 104 to be powered up and held in reset by the external controller 108. Operation proceeds to block 414.

At block 414, the external controller 108 reads the address 114 from the hardware register 106 and causes the processor 104 to begin fetching instructions at the address 114, which is the entry point of the fifth firmware image 112 that was written by the external controller 108 at block 409. Operation proceeds to block 416.

At block 416, the fifth firmware image 112 executes to perform a fifth subfunction, i.e., the subfunction of the fifth firmware image 112. Subsequently, the fifth firmware image 112 instructs the external controller 108 to place the system 101 into a low-power inactive state, or alternatively the host processor 122 causes the system 101 to enter the low-power inactive state. In one embodiment, the fifth firmware image 112 writes the hardware register 106 with a firmware image 112 entry point prior to instructing the external controller 108 to place the system 101 into a low-power inactive state. Operation proceeds to block 418.

At block 418, the external controller 108 reads a next, i.e., second, entry point in the ordered sequence of entry points from the transition map 118 and overwrites the hardware register 106 with the entry point of a sixth firmware image 112, e.g., firmware image 2 112-2. Operation proceeds to block 422.

At block 422, the system 101 resumes from the low-power inactive state to the active state, which causes the processor 104 to be powered up and held in reset by the external controller 108. Operation proceeds to block 424.

At block 424, the external controller 108 reads the address 114 from the hardware register 106 and causes the processor 104 to begin fetching instructions at the address 114, which is the entry point of the sixth firmware image 112 that was written by the external controller 108 at block 418. Other transitions similar to those performed above from the initial firmware image 112 to the fifth firmware image 112 and from the fifth firmware image 112 to the sixth firmware image 112 may also be performed in order to execute each of the desired subfunctions to achieve the full functionality of the system 101. Additionally, transitions achieved by one or more writes of the hardware register 106 by the external controller 108 may be combined with transitions achieved by one or more writes of the hardware register 106 by the host processor 122, as described with respect to FIG. 3, and may be combined with transitions achieved by one or more writes of the hardware register 106 by the processor 104 while executing a previously executed firmware image 112, as described with respect to FIG. 2. That is, firmware image 112 transitions may be achieved by writes to the hardware register 106 by different combinations of the host processor 122, external controller 108, and processor 104.

In other embodiments of FIGS. 2, 3 and/or 4, a transition from a current firmware image 112 to a previous firmware image 112 may occur, e.g., a transition from the current firmware image 112 back to the initial firmware image 112 may occur. Furthermore, in other embodiments of FIGS. 2, 3 and/or 4, a transition from a current firmware image 112 to the same firmware image 112 may occur. For example, with respect to FIG. 2, at block 216, the second firmware image 112 may not overwrite the hardware register 106 with the entry point of a third firmware image 112 but instead simply leave its own entry point in the hardware register 106 or may re-write the hardware register 106 with its own entry point. As a result, when the system 101 resumes from the inactive state to the active state at block 218, the external controller 108 reads the entry point of the second firmware image 112 from the hardware register 106 and again causes the processor to begin fetching instructions at the second firmware image 112 as at block 214. In this manner, the second firmware image 112 continues to operate, e.g., to perform a signal processing subfunction, and the benefit of reduced power consumption is enjoyed while the signal processing subfunction is not needed, i.e., while in the inactive state.

Figure 5:
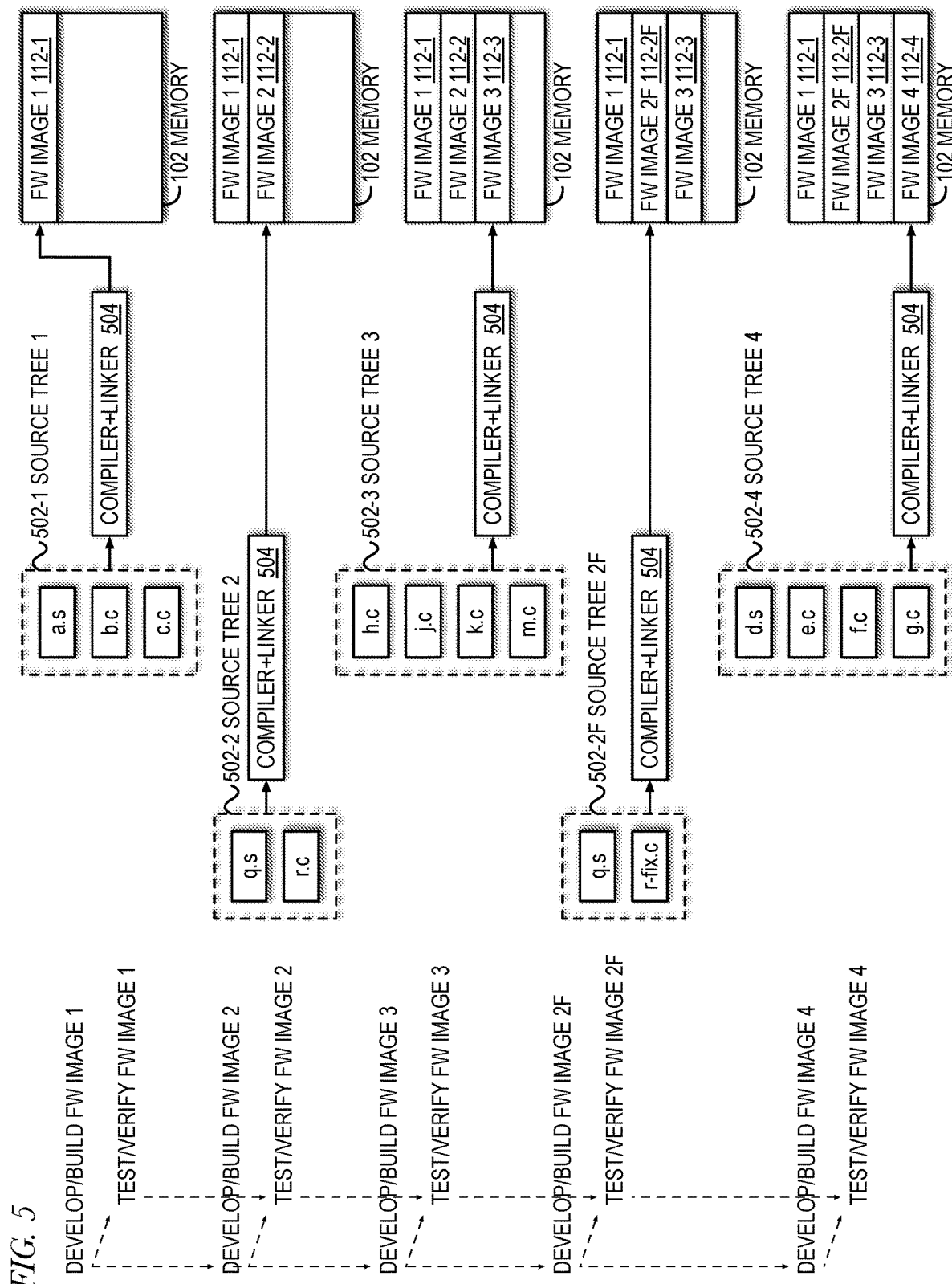
FIG. 5 is an example block diagram illustrating a method for creating and testing the firmware images of FIG. 1 in accordance with embodiments of the present disclosure.

FIG. 5 is an example block diagram illustrating a method for creating and testing the firmware images 112 of FIG. 1 in accordance with embodiments of the present disclosure. FIG. 5 illustrates multiple different states of the memory 102 of FIG. 1 during the course of development and testing of the firmware images 112. Five different firmware images 112 are shown denoted firmware image 1 112-1, firmware image 2 112-2, firmware image 3 112-3, firmware image 2F 112-2F, and firmware image 4 112-4, which are built using source tree 1 502-1, source tree 2 502-2, source tree 3 502-3, source tree 2F 502-2F, and source tree 3 502-3, respectively, each of which are different. Various example filenames (e.g., assembly language and C language files) are shown in each source tree 502. There may be some overlap such that some source files may be included in multiple source trees 502.

Firmware developers develop the source files of the source tree 502. Development tools, such as a compiler and linker 504 are used to build a source tree 502 into its respective firmware image 112. Preferably, each firmware image 112 is generated as a self-contained executable file that may include a vector table, headers, code and data sections, a version number, and a CRC of the firmware image 112. Once a firmware image 112 is built, it is programmed, or "burned," into the memory 102. The firmware image 112 may be tested/verified and iterated upon by updating the source files, re-building, programming the memory 102, and testing until the firmware image 112 is verified (e.g., by a verification group) to perform according to its specifications. Variations of the development/build and testing/verification steps may be performed with respect to the personnel that perform them. In the example of FIG. 5, different steps of the process for the different firmware images 112 are shown. Generally, time may be viewed as flowing downward in FIG. 5, and some of the steps may overlap.

Initially, firmware image 1 112-1 is developed/built and then tested/verified after which the state of the memory 102 includes firmware image 1 112-1. Subsequently, firmware image 2 112-2 may be developed/built and then tested/verified, after which the state of the memory 102 includes firmware image 1 112-1 and firmware image 2 112-2. Similar steps are performed for firmware image 3 112-3 after which the state of the memory 102 includes firmware image 1 112-1, firmware image 2 112-2, and firmware image 3 112-3. Similar steps are performed for firmware image 2F 112-2F after which the state of the memory 102 includes firmware image 1 112-1, firmware image 2F 112-2F, and firmware image 3 112-3. This image inclusion is because firmware image 2F 112-2F replaces firmware image 2 112-2 in the memory 102 because firmware image 2F 112-2F was built to replace firmware image 2 112-2, for example because a bug in a source file of the source tree 2 502-2 was fixed in source tree 2F 502-2F. Similar steps are performed for firmware image 4 112-4 after which the state of the memory 102 includes firmware image 1 112-1, firmware image 2F 112-2F, firmware image 3 112-3, and firmware image 4 112-4. The example of FIG. 5 is provided for illustration, and other numbers and combinations of firmware images 112 may be developed, built, tested and verified.

Generally speaking, the steps associated with the various firmware images 112 may be performed concurrently in part and sequentially in part. For example, development of multiple source trees 502 may be performed concurrently and with the concurrent test/verification of multiple firmware images 112. Thus, advantageously, the full system 101 functionality may be divided into multiple components, i.e., the multiple firmware images 112, that each performs a subfunction that may be reusable according to different subfunction combinations. Although each firmware image 112 performs a subfunction of the full functionality of the system 101, each firmware image 112 is a self-contained entity and may be separately booted and tested independently from the other firmware images 112, which may advantageously facilitate concurrent development and/or testing/verification of the different firmware images 112 to reduce time to market and/or increase the robustness of the firmware images 112 relative to a memory 102 programmed with a single monolithic firmware image 112 that performs all the subfunctions needed to achieve the full system 101 functionality. Although each firmware image 112 is self-contained, advantageously as described above, multiple firmware images 112 may be effectively linked together through the agency of the hardware register 106 and external controller 108 that operate to effectively bridge a hardware-firmware boundary to enable transition of execution of the processor 104 to a next firmware image 112 entry point that was previously written to the hardware register 106 and maintained therein by the "always on" power domain of the system 101.

Described herein are embodiments of a system having a processor and an external controller, distinct functional states (e.g., execution of firmware images 112 by the processor 104) including an initial functional state and a non-functional dormant state (e.g., low-power inactive state). The system also includes a memory store to house, in a well-partitioned manner, programmed/pre-determined behaviors (e.g., subfunctions of firmware images) in functional states. The system achieves arbitrary transitions into and between the functional states, potentially through a dormant state, as determined by a controller external to the processor and facilitated by a boot-vector register (e.g., hardware register 106) seeded with an initial value (pointer/address) to ensure commencement in the initial state by the external controller. The next value (pointer/address) of the boot-vector register is statically or dynamically determined and updated. The boot-vector register may be updated by a precedent functional state (e.g., upon the current functional state communicating its end to the external controller) to point to and facilitate eventual transition into the next functional state. The boot-vector register may also or alternatively be updated by the external controller itself, e.g., according to a transition map with an ordered sequence of entry points. The boot-vector register may also or alternatively be updated by a host processor external to the system.

Also described herein are embodiments of a method of systematically partitioning/re-partitioning a memory store to house programmed/pre-determined behaviors in functional states of the system so as to allow for the independent evolution of behaviors in the functional states including additions, modifications and/or deletions of behaviors within each state and additions of new and/or deletions of extant functional states with the concomitant benefit of accrual and retention of technical assets arising from prior testing and verification of the behaviors in unmodified functional states leading to non-recurrence of technical debt for the same.

Also described herein are embodiments of a method of constructing and maintaining a forest of source trees to define programmed/pre-determined behaviors in functional states of the system and related ancillary information, including a transition map, to facilitate the realization of the systematic partitioning/re-partitioning method. Transitions into and between the states is facilitated by the boot-vector register in the system. The method supports the independent evolution of codified behaviors in the system to accrue and retain the benefits described above.

Also described herein are embodiments in which the memory store may be wholly or in part realized in a non-mutable/non-volatile manner and thereby early and extensive testing and verification of behaviors of functional states included in the desirable and beneficial partial realization is facilitated.

Embodiments are now described that include additional features to those described above of systems and methods that enables execution of multiple code images in sequence, enabling firmware modularity by enabling creation of separate boot and mission mode firmware images and sequencing through them, thus advantageously accelerating and parallelizing modular firmware development. In one embodiment, the system enables execution of debug and prototype ROM firmware images that are executed from RAM. In one embodiment, the system enables execution of production test firmware images to accelerate product test and save test time and expense in the factory. A multi-processor system embodiment having a hardware register corresponding to each processor into which the entry point of the next firmware image to be executed may be written is described. A multi-system embodiment is also described in which the multiple integrated circuits are in communication via inter-system communication interfaces.

Figure 6:
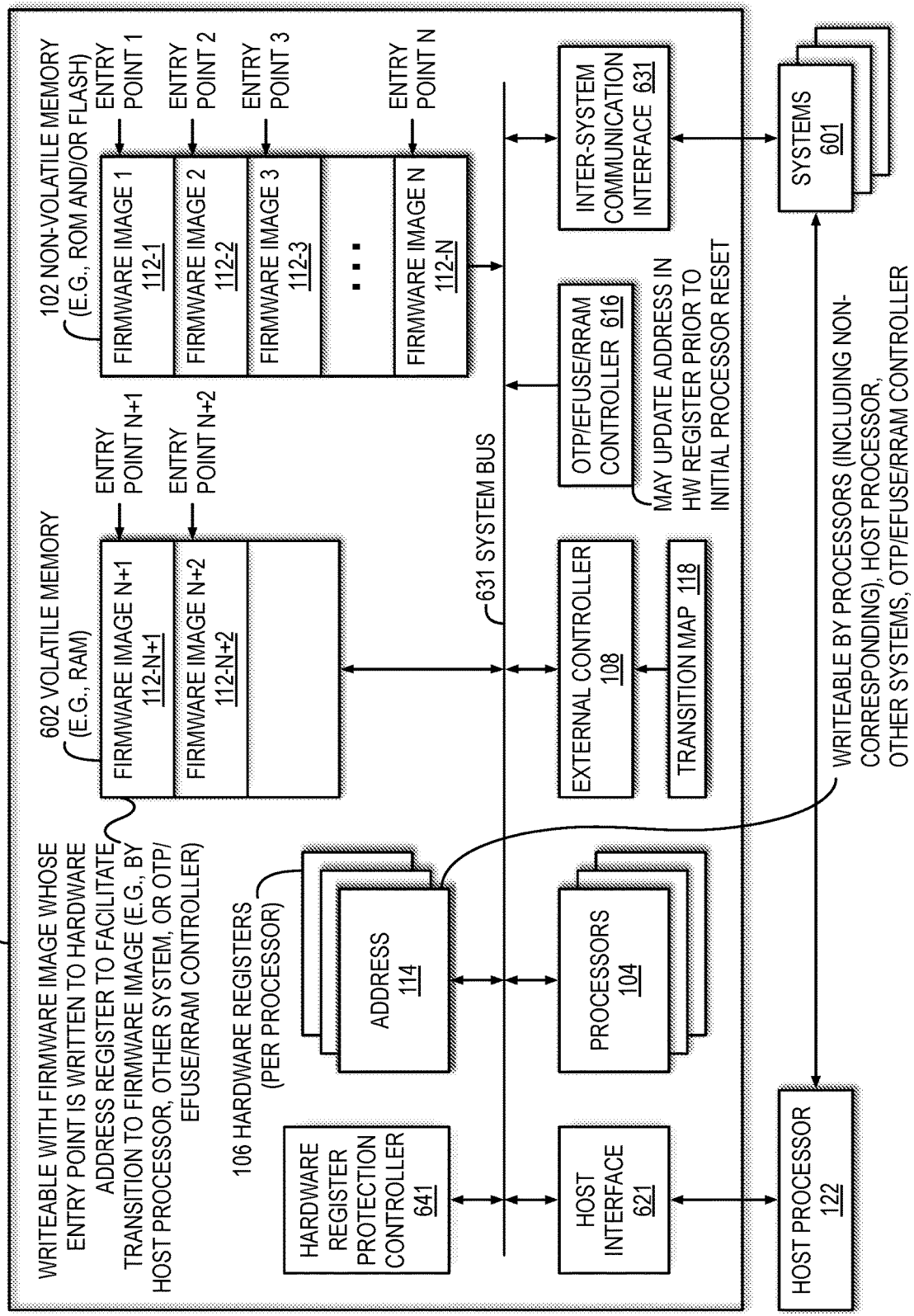
FIG. 6 is an example apparatus in accordance with embodiments of the present disclosure.

FIG. 6 is an example apparatus 600 in accordance with embodiments of the present disclosure. The apparatus 600 of FIG. 6 includes a host processor 122 (similar to like-numbered host processor 122 of FIG. 1) in communication with each of multiple systems 601 via a host interface 621 of each system 601, which may be, for example, an I²C interface, a serial wire debug (SWD) interface, or a similar interface. The multiple systems 601 bi-directionally communicate with one another via an inter-system communication interface 631, which may be, for example, an IT interface or a similar interface. As described above, each of the systems 601 may be an integrated circuit. The multi-system 601 embodiment may be particularly advantageous in an apparatus 600, for example, that requires sensors located in one part of the apparatus 600 and actuators located in another part of the apparatus 600 or some combination of the two. The multi-integrated circuit 601 embodiment may reduce the number of analog signals and the distance over which the analog signals need to be run within the apparatus 600 with respect to a conventional solution that places all of the sensors and actuators on a single integrated circuit. Each of the systems 601 of FIG. 6 are similar in many respects to the system 101 of FIG. 1, and like-numbered elements are similar unless otherwise described. However, further differences between the apparatus 600 of FIG. 6 and the apparatus 100 of FIG. 1 will now be described.

In the embodiment of FIG. 6, each system 601 includes a system bus 631 to which are coupled multiple processors 104 (also referred to as cores 104), multiple hardware registers 106 corresponding to the multiple processors 104 configured to hold corresponding addresses 114 (also referred to as a reset vector 114), the memory 102 of FIG. 1 shown in FIG. 6 as a non-volatile memory 102 programmed with firmware images 112, the external controller 108 and transition map 118 of FIG. 1, an inter-system communication interface 631, a host interface 621, a hardware register protection controller 641, an OTP/EFUSE/RRAM controller 616, and a volatile memory 602 (e.g., a random-access memory (RAM). One or more firmware images 112 (e.g., firmware image N+1 112-N+1, firmware image N+2 112-N+2) may be written to the volatile memory 602, each having its respective entry point (e.g., entry point N+1, entry point N+2) as shown in FIG. 6, that may be written as an address 114 into one or more of the hardware registers 106 to facilitate a transition to a firmware image 112 of the volatile memory 602, as described in more detail below. The system bus 631 facilitates communication between the elements coupled to the system bus 631.

As in the apparatus 100 of FIG. 1, in the example apparatus 600 of FIG. 6, before each reset, or power-up, of each processor 104, the external controller 108 reads the address 114 currently in each hardware register 106 and causes the corresponding processor 104 to begin fetching instructions at the corresponding address 114 to facilitate transitions from one firmware image 112 to another. Further as in the apparatus 100 of FIG. 1, at least a portion of each system 601 of the embodiment of FIG. 6 remains powered on from the initial processor reset through the various firmware image transitions. More specifically, at least the "always on" power domain of the system 601 remains powered on in order to retain the address 114 written thereto by elements of the apparatus 600 (e.g., OTP/EFUSE/RRAM controller 616, corresponding processor 104, non-corresponding processors 104, host processor 122, other systems 601) to effectuate transitions between firmware images 112 even through non-functional dormant states (or standby states, e.g., low-power inactive states) of the system 601.

In one embodiment, the non-volatile memory 102 may be a ROM. In one embodiment, the non-volatile memory 102 may be a flash memory. In one embodiment, the non-volatile memory 102 may be both a ROM and a flash memory, each of which may be programmed with firmware images 112. The flash memory 102 may be programmed during production of the system 601. The flash memory 102 may also be writable after production of the system 601, e.g., by a user/consumer of the system 601, with a firmware image 112 that will remain in the non-volatile flash memory 102 even after the system 601 is powered off, thereby advantageously facilitating bug fixes and additions of new functionality to the system 601, including the boot firmware image 112 that may be the initial firmware image 112 whose entry point the external controller 108 reads from the hardware register 106 at power up of the system 601.

As stated above, rather than a single processor 104 as in the system 101 of FIG. 1, each of the systems 601 of FIG. 6 may include multiple processors 104, and each of the processors 104 has its own corresponding hardware register 106 for holding a corresponding address 114 that may be an entry point of a firmware image 112 for use in transitioning between different firmware images 112 to be executed by the corresponding processor 104, as described above. That is, the external controller 108 holds each processor 104 in reset until the external controller 108 has read the address 114 from each hardware register 106 and provided it to the corresponding processor 104. As described above, the external controller 108 then releases the processor 104 from reset so that the processor 104 begins to fetch instructions from the non-volatile memory 102, or alternatively from the volatile memory 602, at the address 114 provided to the processor 104 by the external controller 108. As described above, the integrated circuit may include an "always on" power domain that keeps the hardware register 106 powered to retain the current value of the address 114 even when other elements of the integrated circuit are powered down during a lower power inactive state of the system 601 to reduce power consumed by the integrated circuit. In one embodiment, a processor 104 may write an entry point of a firmware image 112 into not only its own corresponding hardware register 106, but also into the hardware register 106 of another processor 104, i.e., a non-corresponding processor 104, subject to protection by the hardware register protection controller 641. Additionally, in one embodiment, a processor 104 of one system 601 may write an entry point of a firmware image 112 into the hardware register 106 corresponding to a processor 104 of different system 601, again subject to protection by the hardware register protection controller 641.

The hardware register protection controller 641 may be configured to prevent update of one or more of the hardware registers 106 by one or more of the elements coupled either directly to the system bus 631 or indirectly via the host interface 621 (i.e., host processor 122) or indirectly via the inter-system communication interface 631 (i.e., another system 601, e.g., a processor 104 thereof). For example, in one embodiment, one of the processors 104 of a system 601 may be designated as the supervisor processor 104 of the system 601, and the supervisor processor 104 may be allowed to prevent other processors 104 from writing the hardware register 106 corresponding to the supervisor processor 104. In one embodiment, the hardware register protection controller 641 imposes two levels of protection against updates of a hardware register 106. First, a write to a hardware register 106 will only be allowed if a protection signal is high that corresponds to the bus master on the system bus 631 issuing the write. In one embodiment, the protection signal is set to high for the supervisor processor 104 and for the host interface 621. Second, a write to a hardware register 106 will only be allowed if a write enable signal that resides in a bus master state machine is high, which may be set high through a bus controller register write (e.g., an Advanced Microcontroller Bus Architecture (AMBA) Advanced Peripheral Bus (APB) controller). In one embodiment, the write enable signal is hidden in a different address/block than the hardware registers 106.

The OTP/EFUSE/RRAM controller 616 is similar to the OTP 116 of FIG. 1 in that it may hold configuration values that the processor 104 reads and uses to configure the system 101, as described above. In one embodiment, the configuration values may be stored in EFUSES. In yet another embodiment, the configuration values may be stored in resistive random-access memory (RRAM). Additionally, the OTP/EFUSE/RRAM controller 616 may write the hardware registers 106 with an entry point of a firmware image 112. In one embodiment, the OTP/EFUSE controller 616 may write a different entry point than the entry point of the initial firmware image, i.e., different than the initially seeded address at power-on of the integrated circuit, to the hardware register 106 prior to an initial reset of the corresponding processor 104 such that the external controller 108 reads the different entry point from the hardware register 106 and causes the processor 104 to begin fetching instructions at the different entry point read from the hardware register 106 rather than the entry point of the initial firmware image. In one embodiment, the different entry point may be of a firmware image 112 written to the flash memory 102.

In one embodiment, at least one of the firmware images 112 may be programmed to perform production tests of the integrated circuit 601 during its production that would otherwise be performed by test equipment that may be expensive and/or scarce and in high demand and/or that may communicate back and forth with the integrated circuit 601 over a slow interface consuming precious production time. In this respect, having each system 601 itself, i.e., the processor(s) 104 in the system 601, perform the production tests on the system 601 may facilitate the testing of a greater number of systems 601 in parallel than would be possible using the expensive/scarce test equipment and may reduce cost, each of which may be a significant benefit, particularly for high volume production and/or as test times increase. In one embodiment, the product test firmware image 112 may also be programmed to perform calibrations of the system 601 that may be programmed into the OTP/EFUSES/RRAM. Preferably, the product test firmware image 112 may be programmed into the non-volatile memory 102 (e.g., ROM) during production of the integrated circuit, and the hardware register 106 may be written with the entry point of the production test firmware image 112 to facilitate transition thereto. Embodiments are also contemplated in which the production test firmware image 112 is written to the volatile memory 602 or flash memory 102, e.g., by a host processor 122.

The volatile memory 602 is writeable with one or more firmware images 112 by the OTP/EFUSE/RRAM controller 616, by a processor 104 of the system 601 itself (e.g., for a different processor 104 of the system 601 to transition to), by the host processor 122, or by another system 601, i.e., a system 601 different than the system 601 that includes the volatile memory 602 (e.g., as described in more detail below with respect to FIG. 10). The ability to write a firmware image 112 into the volatile memory 602 and write its entry point to a hardware register 106 to facilitate a transition to the firmware image 112 may provide various features and advantages.

In one embodiment, the firmware image 112 written to the volatile memory 602 and executed therefrom may be a debug firmware image used to debug the system 601. That is, the debug firmware image 112 is a modifiable version of a ROM firmware image 112, i.e., a firmware image 112 already programmed into the ROM 102. The debug firmware image 112 executed from the volatile memory 602 may be used to debug the ROM firmware image 112. That is, since the ROM 102 cannot be re-programmed, the debug firmware image 112 may be helpful to debug the ROM firmware image 112 by effectively making changes to code that is the non-modifiable ROM.

In another embodiment, the firmware image 112 written to the volatile memory 602 and executed therefrom may be a modifiable version of a ROM firmware image 112 that may be used to accelerate the prototyping, testing, and verification of revisions of the ROM firmware image 112.

In another embodiment, the firmware image 112 written to the volatile memory 602 and executed therefrom may be a patched version of a ROM firmware image 112. In one embodiment, the system 601 includes a patch mechanism used to patch a ROM firmware image 112. However, in the event of a failure of the patch mechanism or the inability of the patch mechanism to patch as needed, the patched version of a ROM firmware image 112 may be written to the volatile memory 602, and its entry point may be written to the hardware register 106 to facilitate transition thereto.

In another embodiment, the firmware image 112 written to the volatile memory 602 and executed therefrom may be a mission mode firmware image 112 developed subsequent to production of the system 601 that accomplishes additional functionality, e.g., that was not anticipated at the time of production of the integrated circuit or for which there was not sufficient time to develop the additional functionality, thus advantageously shortening time to market.

Figure 7:
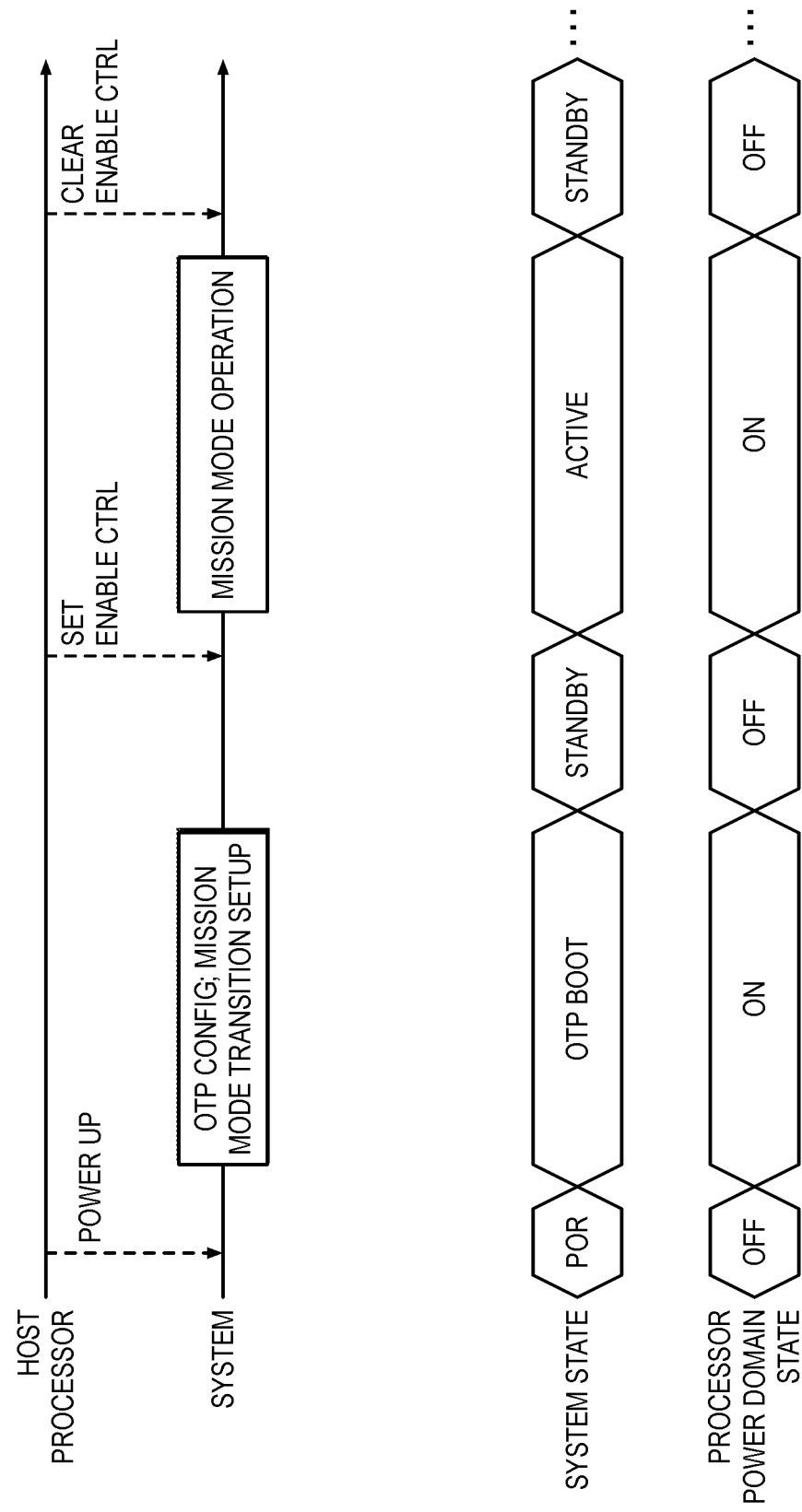
FIG. 7 is an example sequence diagram illustrating a system of FIG. 6 sequencing different firmware images in accordance with embodiments of the present disclosure.

FIG. 7 is an example sequence diagram illustrating a system 601 of FIG. 6 sequencing different firmware images 112 in accordance with embodiments of the present disclosure. Time proceeds from left to right and indicates various events as well as the system 601 state and the state of the power domain of the processor(s) 104. Initially, the system 601 (e.g., integrated circuit) is powered off. Then the host processor 122 causes the system 601 to be powered up (e.g., as at block 202 of FIG. 2), which puts the system 601 into a power on reset (POR) state. Once powered, the OTP/EFUSE/RRAM controller 616 reads configuration values from the OTP/EFUSES/RRAM and writes them to configuration registers of the system 601. In one embodiment, the configuration values may include an entry point of a firmware image 112, and the configuration registers may include a hardware register 106, as described in more detail below with respect to FIG. 9. Subsequently, the processor 104 is powered up and the external controller 108 reads the reset vector 114, i.e., the entry point of the initial firmware image 112, from the hardware register 106, provides it to the processor 104, and causes the processor 104 to begin fetching and executing instructions from the firmware image 112 whose entry point was provided to the processor 104 by the external controller 108 (e.g., as at block 204 of FIG. 2). Thus, the processor(s) of the system 601 runs using the default boot firmware image 112 (e.g., as at block 206 of FIG. 2). The boot firmware image 112 adjusts the reset vector 114 in the hardware register 106 to point to the next (e.g., mission mode) firmware image 112 before going into standby system state in which power is removed from the processor 104 and other portions of the system 601 outside the "always on" power domain (e.g., as at block 208 of FIG. 2). When the system 601 next powers up, e.g., when the host processor 122 sets an enable control signal (e.g., as at block 212 of FIG. 2), the mission mode reset vector 114 in the hardware register 106 is consulted by the external controller 108 to cause the mission mode firmware image 112 to run (e.g., as at blocks 212, 214 and 216 of FIG. 2, or as at blocks 312, 314 and 316 of FIG. 3, or as at blocks 412, 414 and 416 of FIG. 4). The host processor 122 may subsequently clear the enable control signal to put the system 601 in the standby state a second time. The hardware register 106 may be written again with yet a third reset vector 114 (e.g., as at block 216 of FIG. 2, or as at block 318 of FIG. 3, or as at block 418 of FIG. 4). By writing the hardware register 106, the reset vectors 114 can be used to transition through an arbitrarily large sequence of firmware images 112 in order.

Figure 8:
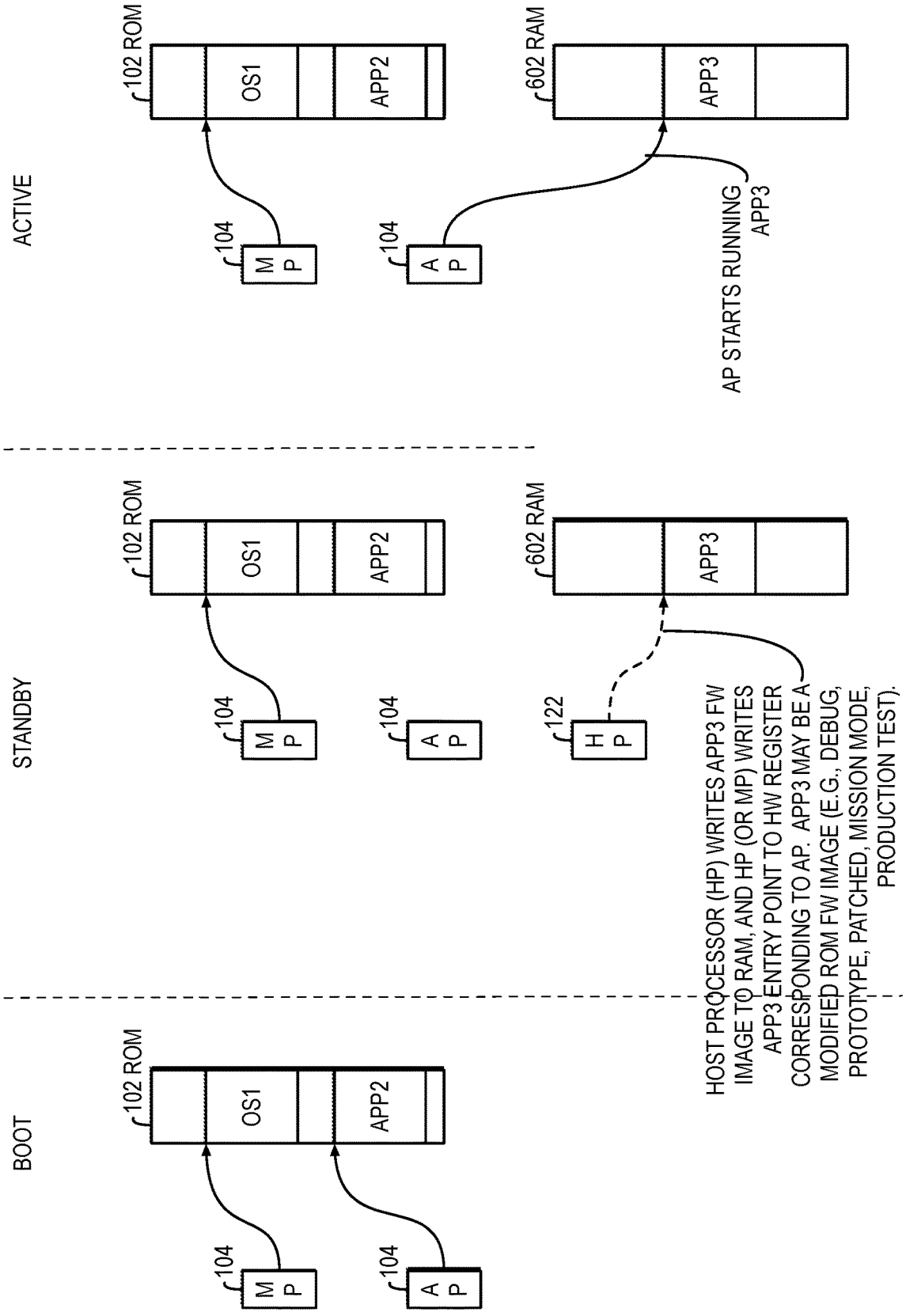
FIG. 8 is an example timing diagram illustrating a multi-processor system of FIG. 6 utilizing relocatable reset vectors to execute a ROM firmware image from the volatile memory (e.g., RAM) in accordance with embodiments of the present disclosure.

FIG. 8 is an example timing diagram illustrating a multi-processor system 601 of FIG. 6 utilizing relocatable reset vectors 114 to execute a ROM firmware image 112 from the volatile memory 602 (e.g., RAM) in accordance with embodiments of the present disclosure. In the description of FIG. 8, two different processors 104 of the system 601 are referred to as the master processor 104 (MP) and the application processor 104 (AP), and the host processor 122 is referred to as HP. The firmware image 112 run by the MP is referred to as the operating system (OS1), and applications run by the AP are referred to as APPn, where different values of "n" refer to different firmware images 112, e.g., APP1 and APP2. Time progresses from left to right as in FIG. 7.

Initially, the MP and AP both boot from firmware images 112 in ROM 102 (or flash 102) in a manner similar to that described above, e.g., with respect to FIG. 7, in which the MP runs the OS1 and the AP runs APP2, according to the initially-seeded values of the corresponding reset vectors 114 within the corresponding hardware registers 106. Then the system 601 is put into the standby state similar to that described above, e.g., with respect to FIG. 7.

During the standby state, the host processor 122 writes a new firmware image 112, APP3, into the RAM 602 via the host interface 621. Then, the host processor 122 writes the hardware register 106 corresponding to the AP with the entry point of APP3. Alternatively, the MP writes the hardware register 106 corresponding to the AP with the entry point of APP3. As described above, APP3 may be a modified version of a ROM firmware image 112, e.g., a debug firmware image 112, a prototype firmware image 112, a patched firmware image 112, a mission mode firmware image 112, or a production test firmware image 112.

The system 601 may be used in a manner as described in FIG. 8 to advantageously enable rapid prototyping for revisions of ROM, OTP image format, or flash memory firmware images 112 to extend the product life cycle. Furthermore, the system 601 facilitates update of the firmware image 112 of one processor 104 while keeping the firmware images 112 of the remaining processors 104 the same.

FIG. 9 is an example flowchart illustrating operation of a processor 104 of a system 601 of FIG. 6 to boot from an initial firmware image 112 different from the firmware image 112 whose entry point is initially seeded in the corresponding hardware register 106 at power up of the system 601 in accordance with embodiments of the present disclosure. Operation begins at block 902.

At block 902, the system 601 powers up, e.g., as described with respect to FIG. 7, and the OTP/EFUSE/RRAM controller 616 reads configuration values from the OTP, EFUSES and/or RRAM and writes the configuration values to configuration registers of the system 601. In the embodiment of FIG. 9, at least one of the configuration registers includes a hardware register 106, and at least one of the configuration values includes the entry point of a firmware image 112, referred to here as the second firmware image 112, that is different from the initial firmware image 112 with whose entry point the hardware register 106 is initially seeded at power up of the system 601. Operation proceeds to block 904.

At block 904, the external controller 108 reads the address 114, i.e., the entry point of the second firmware image 112 written at block 902 by the OTP/EFUSE/RRAM controller 616, from the hardware register 106 and causes the corresponding processor 104 to begin fetching and executing instructions at the entry point of the second firmware image 112 to perform the subfunction of the second firmware image 112 rather than the subfunction of the initial firmware image 112. For example, the subfunction of the second firmware image 112 may be similar to the subfunction of the initial firmware image 112, but may include a bug fix and/or new functionality that is not present in the initial firmware image 112. In one embodiment, the second firmware image 112 may have been written to the flash memory 102. Preferably, the second firmware image 112 is programmed into the flash memory 102 and the entry point of the second firmware image 112 is programmed into the OTP/EFUSES/RRAM 616 at production time of the system 601, although other embodiments are contemplated in which they are programmed post-production. The embodiment of FIG. 9 may be particularly beneficial in the event that the initial firmware image 112 has become non-operational.

Figure 10:
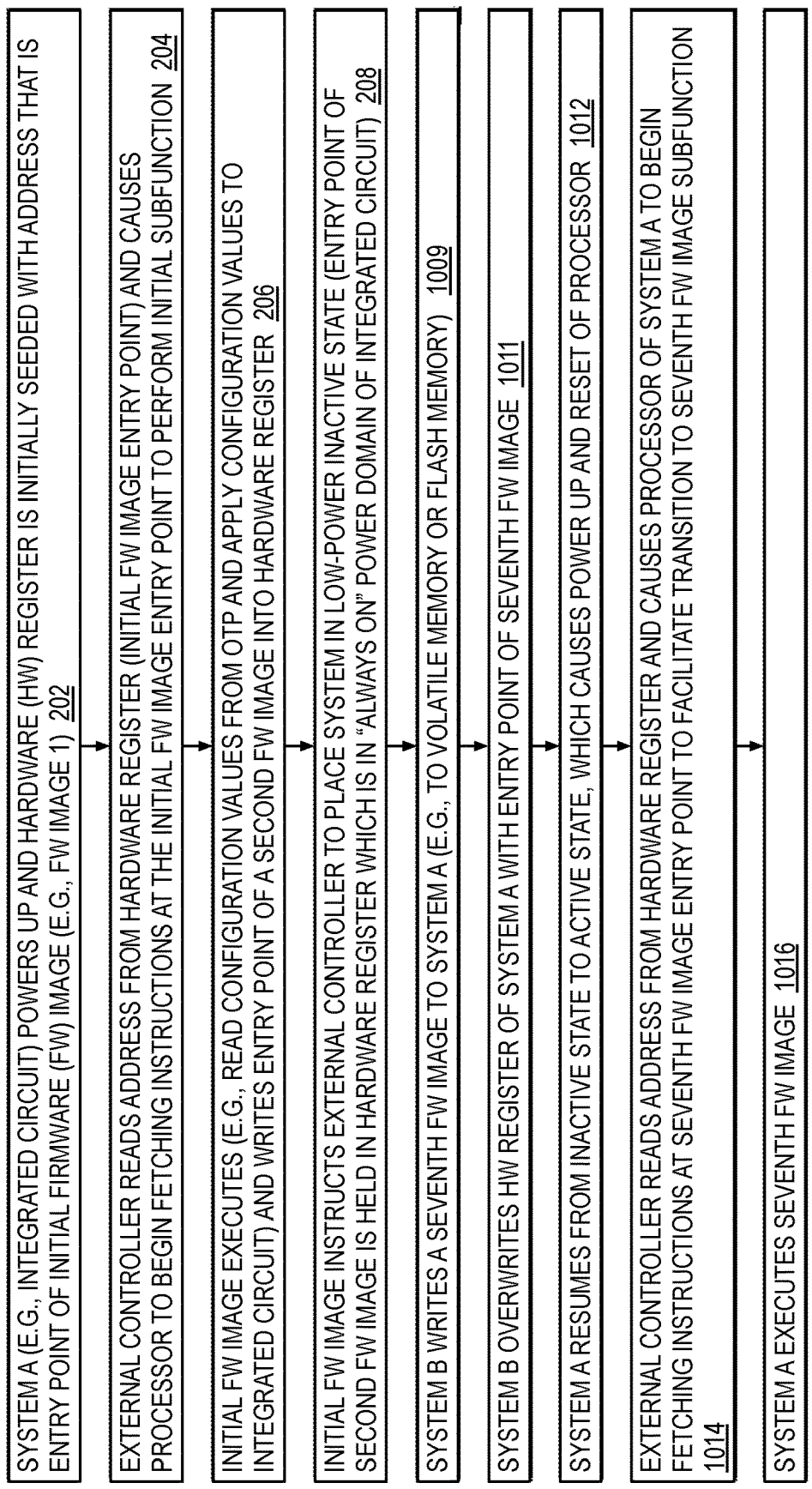
FIG. 10 is an example flowchart illustrating operation of the apparatus of FIG. 6 in which one system writes the hardware register of a different system with the entry point of a firmware image to facilitate a transition thereto in accordance with embodiments of the present disclosure.

FIG. 10 is an example flowchart illustrating operation of the apparatus 600 of FIG. 6 in which one system writes the hardware register of a different system with the entry point of a firmware image to facilitate a transition thereto in accordance with embodiments of the present disclosure. Operation begins at block 202 and proceeds through block 208 as described above with respect to FIG. 2. In FIG. 10, there are two systems 601: system A 601 and a different system B 601. System A 601 is the system described in blocks 202 through 208. System B 601 is described below with respect to blocks 1009 and 1011. Operation proceeds from block 208 to block 1009.

At block 1009, system B 601 writes a seventh firmware image 112, e.g., firmware image N+1 112-N+1, to a memory of system A 601, e.g., to the volatile memory 602 (e.g., RAM) or to a writeable form of the non-volatile memory 102 (e.g., flash memory). Operation proceeds to block 1011.

At block 1011, system B 601 overwrites the hardware register 106 of system A 601 with the entry point of the seventh firmware image 112 written at block 1009. In an alternate embodiment, block 1009 is not performed, i.e., system B 601 does not write a firmware image to system A 601; rather, the seventh firmware image 112 is already present, e.g., in non-volatile memory 102 of system A 601 and therefore need not be written by system B 601. Operation proceeds to block 1012.

At block 1012, system A 601 resumes from the low-power inactive state to the active state (i.e., system A 601 is fully powered), which causes the processor 104 to be powered up and held in reset by the external controller 108. In one embodiment, the system 101 may resume to the active state in response to a signal from system B 601. Operation proceeds to block 1014.

At block 1014, the external controller 108 of system A 601 reads the address 114 from the hardware register 106 and causes the processor 104 to begin fetching instructions at the address 114, which is the entry point of the seventh firmware image 112 that was written by system B 601 at block 1011. Operation proceeds to block 1016.

At block 1016, the processor 104 of system A 601 executes the seventh firmware image 112 to perform a seventh subfunction, i.e., the subfunction of the seventh firmware image 112.

Figure 11:
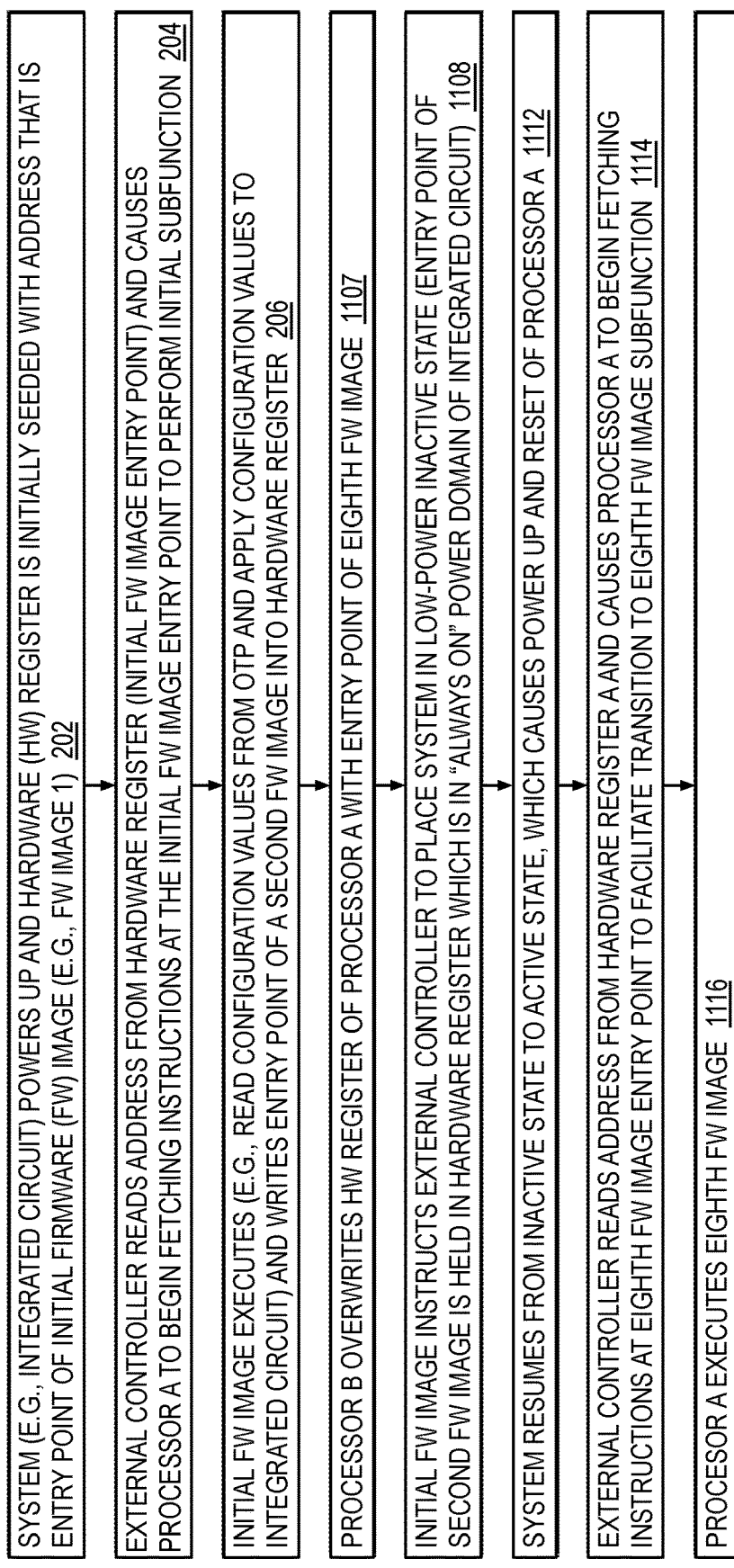
FIG. 11 is an example flowchart illustrating operation of the apparatus of FIG. 6 in which one processor of the system writes the hardware register associated with a different processor of the system with the entry point of a firmware image to facilitate a transition thereto in accordance with embodiments of the present disclosure.

FIG. 11 is an example flowchart illustrating operation of the apparatus 600 of FIG. 6 in which one processor of the system writes the hardware register associated with a different processor of the system with the entry point of a firmware image to facilitate a transition thereto in accordance with embodiments of the present disclosure. Operation begins at block 202 and proceeds through block 206 as described above with respect to FIG. 2. In FIG. 11, there are two processors 104 of the system 601: processor A 104 and a different processor B 104. Processor A 104 is the processor described in blocks 202 through 206. Processor B 104 is described below with respect to block 1107. Operation proceeds from block 206 to block 1107.

At block 1107, processor B 104 of the system 601 overwrites the hardware register 106 of processor A 104 with the entry point of an eighth firmware image 112, e.g., firmware image N 112-N. Operation proceeds to block 1108.

At block 1108, the initial firmware image 112 instructs the external controller 108 to place the system 601 into a low-power inactive state. As described above, even during the low-power inactive state, the address 114 most recently written into the hardware register 106 is maintained because the hardware register 106 (and any other needed logic) is kept powered by the "always on" power domain of the integrated circuit 601. Operation proceeds to block 1112.

At block 1112, the system 601 resumes from the low-power inactive state to the active state (i.e., system A 601 is fully powered), which causes processor A 104 to be powered up and held in reset by the external controller 108. Operation proceeds to block 1114.

At block 1114, the external controller 108 of the system 601 reads the address 114 from the hardware register 106 of processor A 104 and causes processor A 104 to begin fetching instructions at the address 114, which is the entry point of the eighth firmware image 112 that was written by processor B 104 at block 1107. Operation proceeds to block 1116.

At block 1116, processor A 104 executes the eighth firmware image 112 to perform an eighth subfunction, i.e., the subfunction of the eighth firmware image 112.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system comprising:
    a memory programmed with multiple firmware images, wherein each firmware image of the multiple firmware images has an associated entry point that is distinct from the entry point of the other firmware images;
    a processor that fetches instructions of the multiple firmware images from the memory and executes the fetched instructions;
    a hardware register writable with an address; and
    a controller that is external to the processor and that is configured to, with respect to each reset of a sequence of resets of the processor:
        hold the processor in the reset;

read an entry point of one of the firmware images from the hardware register;
write the entry point to the processor; and
release the processor from the reset to cause the processor to fetch its first instruction out of the reset from the memory at the entry point read from the hardware register;
wherein the multiple firmware images comprise:
a boot firmware image;
a mission mode firmware image; and
at least one other firmware image.

2. The system of claim 1,
wherein the system is located within an integrated circuit; and
wherein the at least one other firmware image is programmed to perform production tests of the integrated circuit.

3. The system of claim 2,
wherein the memory comprises a read-only memory (ROM) into which the production test firmware image is programmed.

4. The system of claim 1,
wherein the memory comprises:
a read-only memory (ROM) into which the boot firmware image and the mission mode firmware image are programmed; and
a writeable memory into which the at least one other firmware image is written prior to the fetch of the first instruction of the at least one other firmware image from the writable memory; and
wherein the hardware register is writable with the associated entry point of the at least one other firmware image.

5. The system of claim 4,
wherein the at least one other firmware image comprises a modifiable version of a ROM firmware image written to the writeable memory for execution therefrom, rather than from the ROM, usable to debug the ROM firmware image.

6. The system of claim 4,
wherein the at least one other firmware image comprises a modifiable version of a ROM firmware image written to the writeable memory for execution therefrom, rather than from the ROM, usable to accelerate prototyping, testing, and verification of revisions of the ROM firmware image.

7. The system of claim 4,
wherein the at least one other firmware image comprises a patched version of a ROM firmware image written to the writeable memory for execution therefrom, rather than from the ROM; and
wherein the patched version of the ROM firmware image written to the writable memory overcomes a failure of a patch mechanism.

8. The system of claim 4,
wherein the at least one other firmware image comprises a mission mode firmware image written to the writable memory subsequent to production of the system for subsequent operation therein.

9. The system of claim 1,
wherein the system is located within an integrated circuit; and
wherein the hardware register is located within a power domain of the integrated circuit that remains powered on to preserve the address stored the hardware register even when the processor is powered down.

10. A system comprising:
at least one non-volatile memory programmed with multiple firmware images, wherein each firmware image of the multiple firmware images has an associated entry point that is distinct from the entry point of the other firmware images;
a processor that fetches instructions of the multiple firmware images from the non-volatile memory and executes the fetched instructions;
a hardware register writable with an address, wherein the hardware register is initially seeded with an address that is an initial entry point of an initial firmware image among the multiple firmware images;
a first controller that is external to the processor and that is configured to, with respect to each reset of a sequence of resets of the processor:
hold processor in the reset;
read an entry point of one of the firmware images from the hardware register;
write the entry point to the processor; and
release the processor from the reset to cause the processor to fetch its first instruction out of the reset from the memory at the entry point read from the hardware register; and
a second controller configured to write a second entry point of a second firmware image among the multiple firmware images to the hardware register prior to an initial reset of the sequence of resets of the processor such that the first external controller reads the second entry point from the hardware register and causes the processor to begin fetching instructions at the second entry point read from the hardware register rather than at the initial entry point of the initial firmware image.

11. The system of claim 10,
wherein the second controller is configured to:
read configuration values from a one-time programmable (OTP) memory or EFUSEs or resistive random-access memory (RRAM); and
write the configuration values to configuration registers of the system in response to power up of the system;
wherein the configuration values include the second entry point, and the configuration registers include the hardware register.

12. The system of claim 10,
wherein the at least one non-volatile memory comprises:
a read-only memory (ROM) into which the initial firmware image is programmed; and
a flash memory into which the second firmware image is programmed.

13. A method comprising:
in a system comprising:
a memory programmed with multiple firmware images, wherein each firmware image of the multiple firmware images has an associated entry point that is distinct from the entry point of the other firmware images;
a processor that fetches instructions of the multiple firmware images from the memory and executes the fetched instructions;
a hardware register writable with an address; and
a controller that is external to the processor;
with respect to each reset of a sequence of resets of the processor:
holding, by the external controller, the processor in the reset;
reading, by the external controller, an entry point of one of the firmware images from the hardware register;

writing, by the external controller, the entry point to the
processor; and
releasing, by the external controller, the processor from
the reset to cause the processor to fetch its first
instruction out of the reset from the memory at the
entry point read from the hardware register;
wherein the multiple firmware images comprise:
a boot firmware image;
a mission mode firmware image; and
at least one other firmware image.

14. The method of claim 13,
wherein the system is located within an integrated circuit; and
wherein the at least one other firmware image is programmed to perform production tests of the integrated circuit.

15. The method of claim 14,
wherein the memory comprises a read-only memory (ROM) into which the production test firmware image is programmed.

16. The method of claim 13,
wherein the memory comprises:
a read-only memory (ROM) into which the boot firmware image and the mission mode firmware image are programmed; and
a writeable memory into which the at least one other firmware image is written prior to the fetch of the first instruction of the at least one other firmware image from the writable memory; and
wherein the hardware register is writable with the associated entry point of the at least one other firmware image.

17. The method of claim 16,
wherein the at least one other firmware image comprises a modifiable version of a ROM firmware image written to the writeable memory for execution therefrom, rather than from the ROM, usable to debug the ROM firmware image.

18. The method of claim 16,
wherein the at least one other firmware image comprises a modifiable version of a ROM firmware image written to the writeable memory for execution therefrom, rather than from the ROM, usable to accelerate prototyping, testing, and verification of revisions of the ROM firmware image.

19. The method of claim 16,
wherein the at least one other firmware image comprises a patched version of a ROM firmware image written to the writeable memory for execution therefrom, rather than from the ROM; and
wherein the patched version of the ROM firmware image written to the writable memory overcomes a failure of a patch mechanism.

20. The method of claim 16,
wherein the at least one other firmware image comprises a mission mode firmware image written to the writable memory subsequent to production of the system for subsequent operation therein.

21. The method of claim 13,
wherein the system is located within an integrated circuit; and
wherein the hardware register is located within a power domain of the integrated circuit that remains powered on to preserve the address stored in the hardware register even when the processor is powered down.

22. A method comprising:
in a system comprising:
at least one non-volatile memory programmed with multiple firmware images, wherein each firmware image of the multiple firmware images has an associated entry point that is distinct from the entry point of the other firmware images;
a processor that fetches instructions of the multiple firmware images from the non-volatile memory and executes the fetched instructions;
a hardware register writable with an address, wherein the hardware register is initially seeded with an address that is an initial entry point of an initial firmware image among the multiple firmware images;
a first controller that is external to the processor; and
a second controller;
with respect to each reset of a sequence of resets of the processor:
holding, by the external controller, the processor in the reset;
reading, by the external controller, an entry point of one of the firmware images from the hardware register;
writing, by the external controller, the entry point to the processor; and
releasing, by the external controller, the processor from the reset to cause the processor to fetch its first instruction out of the reset from the memory at the entry point read from the hardware register; and
writing, by the second controller, a second entry point of a second firmware image among the multiple firmware images to the hardware register prior to an initial reset of the sequence of resets of the processor such that the first external controller reads the second entry point from the hardware register and causes the processor to begin fetching instructions at the second entry point read from the hardware register rather than at the initial entry point of the initial firmware image.

23. The method of claim 22, further comprising:
reading, by the second controller, configuration values from a one-time programmable (OTP) memory or EFUSEs or resistive random-access memory (RRAM); and
writing, by the second controller, the configuration values to configuration registers of the system in response to power up of the system;
wherein the configuration values include the second entry point, and the configuration registers include the hardware register.

24. The method of claim 22,
wherein the at least one non-volatile memory comprises:
a read-only memory (ROM) into which the initial firmware image is programmed; and
a flash memory into which the second firmware image is programmed.

* * * * *

UNITED STATES PATENT AND TRADEMARK OFFICE
CERTIFICATE OF CORRECTION

PATENT NO. : 12,169,720 B2
APPLICATION NO. : 17/957708
DATED : December 17, 2024
INVENTOR(S) : Hemkumar et al.

It is certified that error appears in the above-identified patent and that said Letters Patent is hereby corrected as shown below:

In the Claims

In Column 21, Line 66, in Claim 9, delete "stored the" and insert -- stored in the --, therefor.

In Column 22, Line 17, in Claim 10, delete "hold processor" and insert -- hold the processor --, therefor.

Signed and Sealed this
Twenty-fifth Day of February, 2025

Coke Morgan Stewart
*Acting Director of the United States Patent and Trademark Office*